United States Patent
Purohit et al.

(10) Patent No.: US 8,781,873 B2
(45) Date of Patent: Jul. 15, 2014

(54) METHOD AND SYSTEM FOR SCHEDULING ACTIVITIES

(75) Inventors: Atul Purohit, Fremont, CA (US);
Harish Bansal, Fremont, CA (US); Jun Wang, Santa Rosa, CA (US); Praveen Krishnan, Richmond, CA (US); Christopher Scott Nash, Emeryville, CA (US)

(73) Assignee: Siebel Systems, Inc., San Mateo, CA (US)

( * ) Notice: Subject to any disclaimer, the term of this patent is extended or adjusted under 35 U.S.C. 154(b) by 2728 days.

(21) Appl. No.: 10/112,913

(22) Filed: Mar. 28, 2002

(65) Prior Publication Data

US 2007/0208604 A1    Sep. 6, 2007

Related U.S. Application Data

(63) Continuation of application No. 09/825,140, filed on Apr. 2, 2001, now abandoned.

(51) Int. Cl.
*G06Q 10/00* (2012.01)

(52) U.S. Cl.
USPC .................................................. 705/7.18

(58) Field of Classification Search
CPC ............ G06Q 10/109; G06Q 10/1093; G06Q 10/1095; G06Q 10/063116; G06Q 10/02; G06Q 10/10; G06Q 10/06; G06Q 10/025; G06Q 30/0641; G06Q 10/06314; G06Q 10/06315; G06Q 30/00; G06Q 30/0244; G06Q 30/0601
USPC ...................................................... 705/9, 7.18
See application file for complete search history.

(56) References Cited

U.S. PATENT DOCUMENTS

| | | | | |
|---|---|---|---|---|
| 5,323,314 A | * | 6/1994 | Baber et al. .................. | 705/8 |
| 5,737,728 A | * | 4/1998 | Sisley et al. .................. | 705/8 |
| 5,819,263 A | * | 10/1998 | Bromley et al. .............. | 707/3 |
| 5,920,846 A | * | 7/1999 | Storch et al. ................. | 705/7 |
| 5,978,770 A | * | 11/1999 | Waytena et al. .............. | 705/5 |
| 6,016,478 A | * | 1/2000 | Zhang et al. ................. | 705/9 |
| 6,073,110 A | * | 6/2000 | Rhodes et al. ................ | 705/8 |

(Continued)

OTHER PUBLICATIONS

Hydrocarbon Processing's Advanced Control and Information Systems '99, Sep. 1999, Hydrocarbon Processing, v.78, n. 9, p. 75, [online], [retrieved Sep. 24, 2005 via DIALOG file 148:11763764] (111 pages).*

(Continued)

*Primary Examiner* — Jonathan G Sterrett
*Assistant Examiner* — Folashade Anderson
(74) *Attorney, Agent, or Firm* — Campbell Stephenson LLP

(57) ABSTRACT

Techniques to schedule activities. In one method, a request to book an appointment for an activity in a particular schedule is initially received. In response, time slots available in the schedule for booking the activity are determined, and a set (all or a subset) of the time slots is provided as possible appointment choices. The time slots in the set are temporarily locked. A next set of time slots or more time slots may be requested (if the time slots provided are not acceptable or desirable), in which case additional time slots may be provided. Thereafter, a selection for one of the time slots is received. In response, the activity is booked in the selected time slot and previously locked time slots are released. The locked time slots may also be released if no selection is received after a particular amount of time.

23 Claims, 13 Drawing Sheets

(56) References Cited

U.S. PATENT DOCUMENTS

| | | | |
|---|---|---|---|
| 6,101,480 A * | 8/2000 | Conmy et al. | 705/9 |
| 6,389,454 B1 * | 5/2002 | Ralston et al. | 709/204 |
| 6,434,571 B1 * | 8/2002 | Nolte | 705/9 |
| 6,438,747 B1 * | 8/2002 | Schreiber et al. | 717/160 |
| 6,453,376 B1 * | 9/2002 | Fairman et al. | 710/240 |
| 6,480,830 B1 * | 11/2002 | Ford et al. | 705/9 |
| 6,606,529 B1 * | 8/2003 | Crowder et al. | 700/100 |
| 6,701,299 B2 * | 3/2004 | Kraisser et al. | 705/8 |
| 6,718,360 B1 * | 4/2004 | Jones et al. | 718/107 |
| 6,781,920 B2 * | 8/2004 | Bates et al. | 368/10 |
| 7,003,475 B1 * | 2/2006 | Friedland et al. | 705/9 |
| 7,174,303 B2 * | 2/2007 | Glazer et al. | 705/9 |
| 7,283,970 B2 * | 10/2007 | Cragun et al. | 705/8 |
| 2001/0029460 A1 * | 10/2001 | Yonemitsu | 705/8 |
| 2001/0049619 A1 * | 12/2001 | Powell et al. | 705/9 |
| 2002/0049733 A1 * | 4/2002 | Orlick | 707/1 |
| 2006/0129444 A1 * | 6/2006 | Baeza et al. | 705/8 |
| 2007/0219842 A1 | 9/2007 | Bansal et al. | |

OTHER PUBLICATIONS

User's Guide, Microsoft Project 2000 for Windows NT Version 4.0 or Windows 95 or Later. Redmond, Wash.: Microsoft Corporation, 1999. Print. pp. 69-73.*

* cited by examiner

FIG. 3A

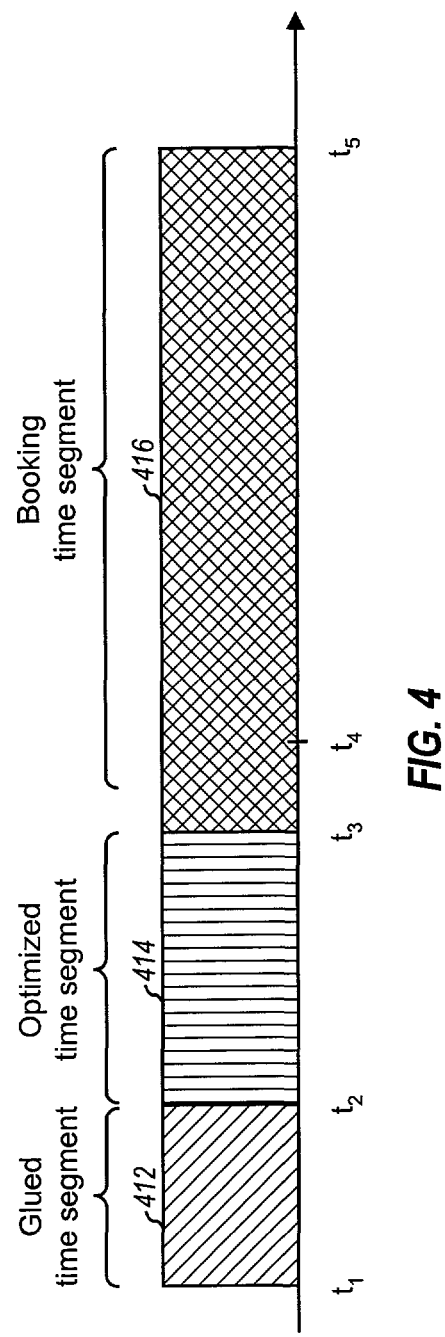

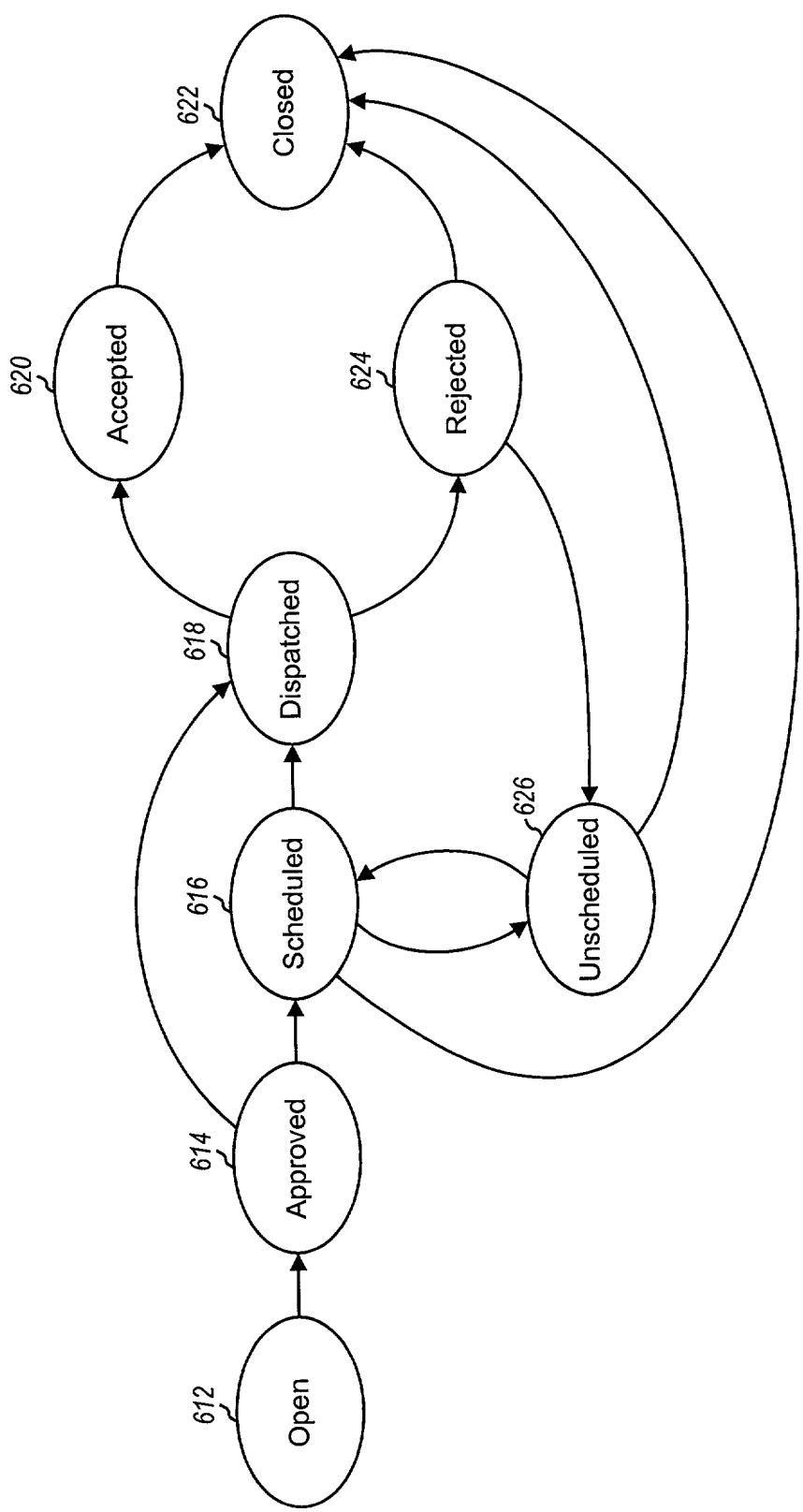

METHOD AND SYSTEM FOR SCHEDULING ACTIVITIES

CROSS-REFERENCE TO RELATED APPLICATION

This application is a continuation of U.S. application Ser. No. 09/825,140, entitled "System and Method for Scheduling Activities," filed Apr. 2, 2001, now abandoned which is incorporated herein by reference in its entirety for all purposes.

BACKGROUND OF THE INVENTION

The present invention relates generally to computer processing, and more particularly to techniques to facilitate the scheduling of activities.

Scheduling activities is a ubiquitous challenge faced by many industries and organizations. In many service-oriented industries, calls may be received from customers requesting certain tasks to be performed. These tasks may relate to installation, repair, or maintenance of products, or may be for various types of services to be rendered. The calls are typically logged (e.g., by a front-end system such as a call center) and activities are generated for the tasks. The activities are thereafter assigned to appropriate personnel and scheduled to be performed.

An operator (or user) designated to schedule the activities may be faced with a myriad of requirements for the activities. For example, an activity may require a field service personnel with a particular skill, a specific set of tools and parts, and so on. Each activity typically further needs to be performed at a particular site and within a particular time window. The available personnel may have different skills and inventory of parts, and may also operate based on different schedules and in different regions. At a minimum, the user needs to assign the activities to the personnel capable of performing the activities. For better utilization of the available resources, the activities should further be scheduled to minimize overhead, such as that associated with traveling between activities. And to improve customer satisfaction, the activities should be scheduled within any given time constraints, which may be imposed, for example, by service agreements with the customers.

As can be seen, the task of scheduling activities to efficiently utilize the available resources can be daunting. The challenge often magnifies as the number of activities, requirements, and/or personnel increases. Thus, techniques that can assist an operator in scheduling activities to achieve the desired goals are highly desirable.

SUMMARY OF THE INVENTION

The invention provides techniques to efficiently schedule activities and to generate more optimum schedules based on initial schedules. An overall coverage area may be partitioned into any number of service regions, each of which may be defined to have any size and shape. A schedule may be maintained for each service region. As the coverage area increases or shrinks, additional service regions may be added or previously defined service regions may be removed or combined. The schedules are thus scalable and may be defined to have any desired size and complexity.

An embodiment of the invention provides a method for scheduling activities. In accordance with the method, a request to book an appointment for an activity in a particular schedule is initially received. In response, time slots available in the schedule for booking the activity are determined, and a set of the time slots is provided as possible appointment choices. The number of time slots in the set may be all or a subset of the available time slots, and this number may be selectable. The time slots in the set are temporarily locked. A next set of time slots or more time slots may be requested (if the time slots provided are not acceptable or desirable), in which case additional time slots may be provided. Thereafter, a selection for one of the time slots is received. In response, the activity is booked in the selected time slot and previously locked time slots are released. The locked time slots may also be released if no selection is received after a particular amount of time or a response is received to cancel the locked time slots.

The schedule may further be locked in response to receiving the request, and unlocked after providing the set of time slots. The duration of the time slots may be determined based on the expected duration of the activity. Soft booking may be performed in which an activity expected to require a particular time duration is booked in a window of a longer duration (e.g., a 1-hour activity may be booked in a 4-hour time window). The available time slots are also typically determined based on a set of parameters associated with the activity (e.g., an earliest time and a latest time between which the activity should be booked) and parameters associated with resources in the schedule.

The schedule may be partitioned into three time segments. The first time segment may cover the time period during which new appointments are booked, the second time segment may cover the time period in which the schedule is optimized, and the third time segment may cover the time period during which the schedule is fixed and no changes due to non-emergency events may be made.

Another embodiment of the invention provides a method for optimizing a schedule. In accordance with the method, an initial schedule of appointments for a number of activities and a set of rules and constraints associated with the schedule are received. A cost for the initial schedule is then computed based on a cost function. The activities in the schedule are next rearranged based on the set of rules and constraints, and a new cost is computed for the rearranged schedule. A more optimum schedule is then selected based on a (Heuristic) improvement algorithm. The schedule may be rearranged a number of times, until a termination criterion is reached.

During the optimization process, if a request to schedule a high-priority activity is received, the request may be placed in a queue. The optimization process may be paused (periodically or occasionally), at which time the requests in the queue may be processed. The high-priority activity may be inserted between activities for a particular resource in the schedule, without disrupting activities for other resources in the schedule. Alternatively, the activities in the schedule may be rearranged and the high-priority activity may be inserted in the appropriate portion of the schedule. The request to schedule a high-priority activity may also be received outside the time the optimization process is performed, and this request would also be appropriately processed (i.e., scheduled, if possible).

Emergency events (e.g., vehicle breakdown) may also be received, and mechanisms are provided to rearrange and reschedule (if possible) activities affected by the emergency events.

The invention further provides other methods, computer program products, systems, and user interface menus, capable of implementing various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

FIGS. 3A and 3B illustrate two user interface menus that may be used to display information for activities and resources for a schedule;

FIG. 4 is a timing diagram for a schedule, in accordance with an embodiment of the invention;

FIG. 6 is a state diagram that illustrates the possible states for an activity, in accordance with an embodiment of the invention;

DESCRIPTION OF THE SPECIFIC EMBODIMENTS

Figure 1:
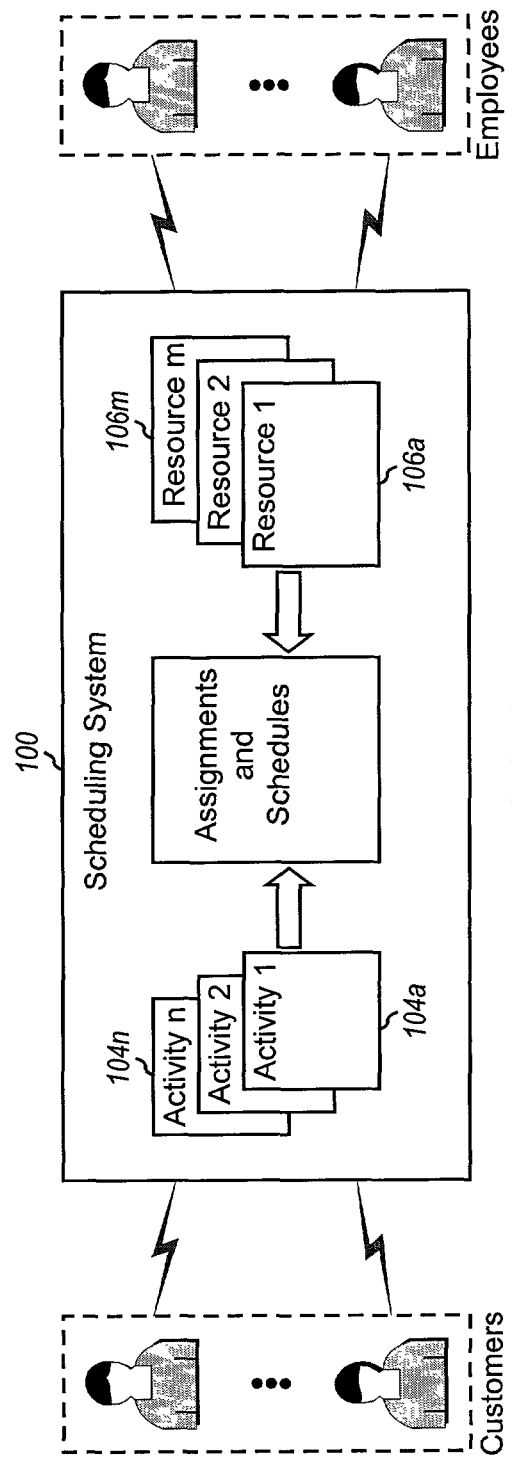
FIG. 1 is a diagram of a simplified view of a scheduling system capable of implementing various aspects of the invention.

FIG. 1 is a diagram of a simplified view of a scheduling system 100 capable of implementing various aspects of the invention. System 100 receives information for activities 104 (e.g., for a number of customers) and is also provided with information for resources 106 (e.g., associated with a number of field service personnel or employees). Each activity 104 may specify a particular task to be performed and the location and times at which the task may be performed. Performance of an activity may require a particular skill, a particular set of tools and parts, and possibly other requirements, which are all typically specified by the activity. Each resource 106 may correspond to a particular field service personnel or employee, and may include information related to the employee's skill, time of availability, coverage area, and so on. The activities and resources may be provided to system 100 via numerous means, some of which are described below.

Scheduling system 100 provides tools to organize and display the activities and resources, tools to enable efficient assignment and scheduling of activities based on the available resources, and mechanisms to optimize schedules to minimize overhead, improve utilization of the available resources, and enhance performance (e.g., increase customer satisfaction). The resultant schedules may be provided to the affected customers and employees. System 100 further provides tools to quickly and easily modify schedules to accommodate last-minute activities, changes, and unexpected events.

Scheduling system 100 may be used for numerous industries and organizations. As an example, the activities may relate to the installation, repair, or service of a particular hardware (e.g., a computer related product, appliance, or equipment).

Each activity is associated with a number of attributes that define the activity. In an embodiment, the attributes for an activity may include (1) the location where the activity is to take place (which may be identified using geocodes or longitude and latitude coordinates), (2) the skills, tools, and parts required to perform the activity, (3) time constraints, (4) the category and type defined for the activity, (5) the priority and status of the activity, and possibly others. In an embodiment, the time constraints for an activity includes a "no-sooner-than" (NST) time that is indicative of the earliest time that the activity may be performed, a "no-later-than" (NLT) time that is indicative of the latest time that the activity may be performed, and a duration expected to be required to perform the activity. These activity attributes are described in further detail below.

Each employee is also associated with a number of attributes that define the skills and availability of the employee as well as other parameters associated with the employee. In an embodiment, the attributes for an employee may include (1) the skills of the employee, (2) the tools and parts available to the employee (e.g., within the employee's accessible inventory), (3) the times during which the employee may be scheduled, (4) the service region(s) covered by the employee, and possibly others. These employee attributes are described in further detail below.

In an embodiment, service regions are defined to facilitate the scheduling of activities. A service region is a geographic area of a particular size and shape, and may be defined by an operator (i.e., the user) of the scheduling system. The size and shape of a service region may be selected and customized specially for the business enterprise for which the system is used. For example, a service region may include a number of zip-code zones, a portion of a metropolitan area, one or more towns, or some other geographic area. A service region may encompass any number of employees and activities.

Table 1 lists various attributes that may be defined for activities, employees, and service regions. Fewer, additional, and/or different attributes may also be defined, and this is within the scope of the invention.

TABLE 1

| Objects | Fields |
| --- | --- |
| Activities | Account, Contact, Geo Territory, Service Region, Address (Geo Code), Priority, Status, Category, No Sooner Than, No Later Than, Planned Start, Planned End, Owner, Skills Required, Parts and Tools Required, Duration, Breaks Allowed Flag, Precedence Constraints, Contract |
| Employees | Skills, Schedule Hours, Exception Hours, Service Region, Parts Inventory, Tools, Average Travel Speed, Hourly Rate |
| Service Regions | Geo Codes covered, Employees, Average Travel Time |

Each schedule may be defined and represented with a hierarchical structure of objects. The main object for each schedule (which represents the corresponding service region) includes a number of child objects such as employee objects, activity objects, and possibly others. Each child object of the main object may be a parent object that further includes a number of child objects. For example, an employee object may include an object for each of the attributes associated with the employee, such as a Skill object, a Parts object, an available times object, and so on. Each attribute object may further include a number of child objects for fields that are used to store parameters for the associated attribute. The hierarchical structure may include any number of parent-child relationship layers.

The invention provides techniques to create and maintain a schedule for each service region.

In one aspect, schedules are created from objects stored in the database, and the schedules are stored in processed form to a local storage. The use of a fast local storage (which may be implemented as a random access memory (RAM)) and the storage of the schedules in processed form expedite access of information in the schedules (e.g., for displaying and scheduling).

In another aspect, the schedules are scalable by properly defining the service regions. The overall coverage area may be partitioned into any number of service regions, each of which may be defined to have any size and shape. As the coverage area increases or shrinks, additional service regions may be added or previously defined service regions may be removed or combined. Correspondingly, objects associated with the overall coverage area may be partitioned and allocated to any number of schedules, each of which may have any number of objects. The schedules may thus be defined to have any desired size and complexity.

In yet another aspect, mechanisms are provided to support access of the schedules by multiple clients and to maintain the schedules current (i.e., up-to-date) and accurate even during multiple accesses. In particular, locking arrangements are provided for the affected portions or the entire schedule. The locking arrangements are described in further detail below.

In yet another aspect, mechanisms are provided to optimize schedules to provide more optimum schedules having lower (i.e., improved) costs. Activities for a schedule may be booked initially as "soft" appointments, i.e., activities expected to require particular time durations are booked in windows having longer durations. The activities in a softly booked schedule may thus be rearranged to provide a more optimum schedule.

Figure 2A:
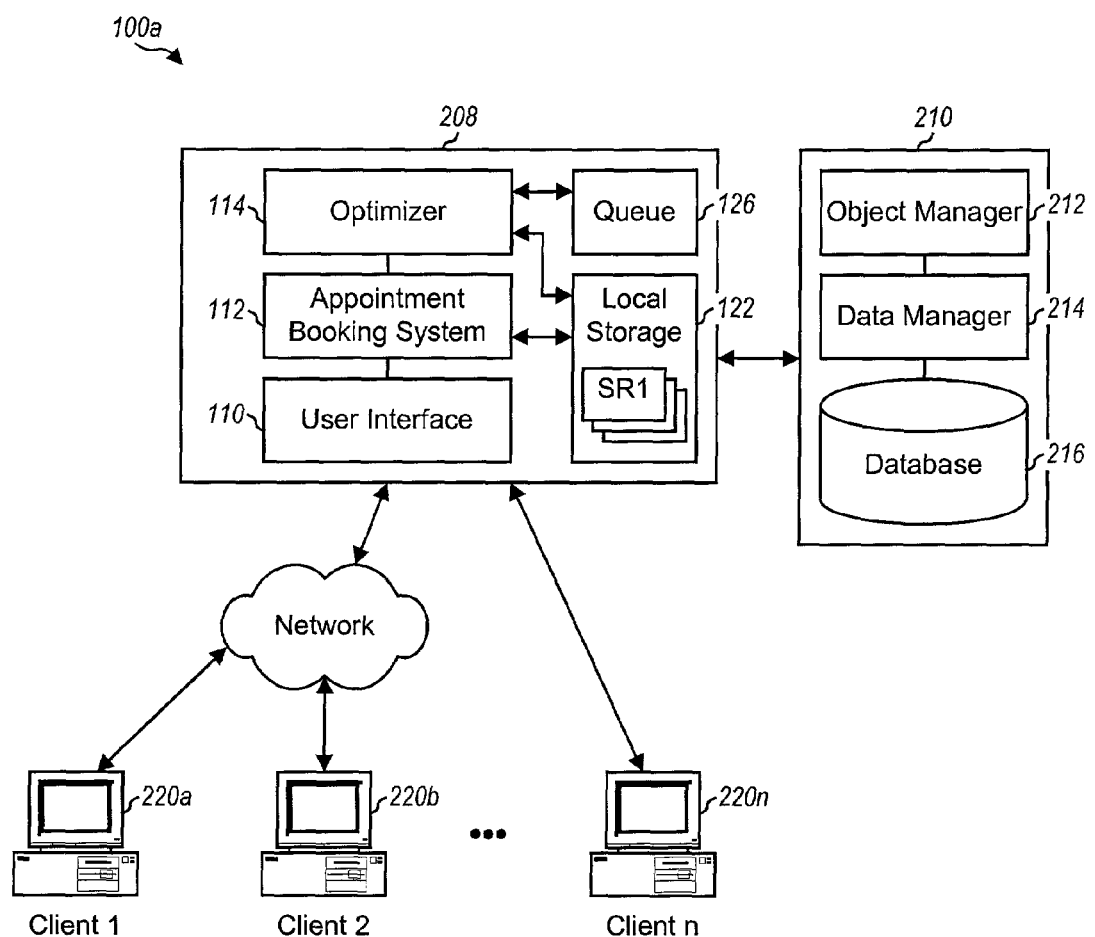
FIGS. 2A and 2B are diagrams illustrating a centralized and a distributed scheduling system, respectively, in accordance with an embodiment of the invention.

FIG. 2A is a diagram illustrating a centralized scheduling system 100a, in accordance with an embodiment of the invention. In this embodiment, scheduling system 100a is implemented within a set of one or more servers 208 that couple to one or more clients 220 via direct connection, a computer network (e.g., the Internet), and/or some other means. Scheduling system 100a further couples to a database 216 that stores data (typically in "raw" form) used by the scheduling system.

In an embodiment, scheduling system 100a includes a number of modules such as a user interface module 110, an appointment booking system (ABS) 112, and an optimizer 114. Additional, fewer, and/or different modules may also be included in scheduling system 100a, and this is within the scope of the invention.

User interface module 110 provides the interface (e.g., screens) used to present information to an operator of the scheduling system. User interface module 110 further receives and interprets user commands and data, which may be provided via mouse clicks, mouse movements, keyboard inputs, and other means. User interface module 110 then provides the received data and commands to other modules, which performs the appropriate responsive action.

Appointment booking system 112 receives requests to book appointments for activities, searches the schedules for the appropriate service regions to determine available time slots, and provides these time slots as possible choices that may be selected for appointments. Appointment booking system 112 further receives selections for time slot choices and performs "soft" booking for the activities. In an embodiment, appointment booking system 112 includes a "contract scheduler" that processes "contract" appointments, as described in further detail below.

Optimizer 114 receives schedules of soft bookings and attempts to optimize the schedules to provide more optimum schedules. The optimization performed on each schedule may be based on a particular heuristic algorithm and a set of rules, constraints, and parameters. Optimizer 114 further receives "contract" scheduling requests to book appointments for activities that falls outside the time segment operated on by appointment booking system 112 (e.g., activities that need to be performed within a short time period and cannot be scheduled in the normal manner). Optimizer 114 then attempts to schedule these activities in a satisfactory manner with minimal disruption to existing schedules.

Table 2 lists various parameters that may be utilized by appointment booking system 112, optimizer (Opt) 114, and the contract scheduler (CS). A check mark in the ABS, Opt, or CS column indicates that this parameter may be provided to, and considered by, that module in performing the supported functions. The parameters listed in Table 2 may be defined by the scheduling system, but the values for these parameters may be selected by the user. Fewer, additional, and/or different parameters may also be utilized, and this is within the scope of the invention. Some of these parameters are described in further detail below.

TABLE 2

| ABS | Opt | CS | System Input Parameters to Module |
|-----|-----|-----|-----------------------------------|
| ✓ | ✓ | ✓ | Rules and constraints |
| ✓ | ✓ | ✓ | Tunable parameters |
| ✓ |   |   | Booking time segment |
|   | ✓ | ✓ | Optimized time segment |
| ✓ |   |   | Number of time slot choices to provide for a request |
| ✓ |   |   | Time slot definitions |
| ✓ |   |   | Mapping between activity duration and time slot |
| ✓ |   |   | Level resource or resource loading option |
| ✓ | ✓ | ✓ | Number of days/hours to be glued |
| ✓ |   |   | Percent booking for employees per day/shift |
|   | ✓ | ✓ | Objective/cost function |

Table 3 lists various parameters that may be selected (i.e., configurable) for appointment booking system 112, optimizer 114, and the contract scheduler. A check mark in the ABS, Opt, or CS column indicates that this parameter may be provided to, and considered by, that module in performing the supported functions. Again, fewer, additional, and/or different parameters may also be provided, and this is within the scope of the invention. Some of these parameters are described in further detail below

TABLE 3

| ABS | Opt | CS | User Input Parameters to Module |
|-----|-----|-----|-----------------------------------|
| ✓ |   |   | Preferred date range for appointment |
|   | ✓ |   | Fixed time window where this activity has to be performed |
|   | ✓ |   | Flag to insert this activity with/without limited disruption |

Table 4 lists some of the outputs that may be provided by appointment booking system 112, optimizer 114, and the contract scheduler. A check mark in the ABS, Opt, or CS column indicates that this output may be provided by that module. Again, fewer, additional, and/or different outputs may also be provided by the modules, and this is within the scope of the invention.

TABLE 4

| ABS | Opt | CS | Module Outputs |
|-----|-----|-----|----------------|
| ✓ |   |   | Available appointments for the given activity |
| ✓ |   |   | Write/confirm the appointment selected by user |
|   | ✓ |   | Assigned and scheduled activities |
|   | ✓ |   | Optimization report (statistics {cost, % Load on Employee, etc.}, exceptions) |

TABLE 4-continued

| ABS | Opt | CS | Module Outputs |
|---|---|---|---|
| | | ✓ | Insertion of activity and re-optimize the schedule |
| | | ✓ | Report that an activity cannot be inserted |

The modules within scheduling system 100a may operate on and share the data stored in database 216. However, the modules may be implemented such that they can be independent executed (e.g., on different servers, or possibly as different processes on the same server). These modules may further be executed in parallel to operate on different schedules or different parts of the same schedule. These modules may communicate with each other via messaging.

In an embodiment, local storage 122 is provided for appointment booking system 112 and optimizer 114. Local storage 122 may be implemented with a semiconductor memory (e.g., RAM, Flash), hard disk, or some other data storage technology that can provide fast access to the data stored thereon. These local storages may be used to store data operated on by the respective modules.

Typically, raw data from database 216 is retrieved by a module and processed into a more suitable form for that module. The processed data is then stored to the associated local storage to allow for fast and efficient access to the data. In an embodiment, a schedule is maintained for each service region, and multiple schedules for multiple service regions may be maintained by scheduling system 100a. Each schedule may be maintained in a respective section of local storage 122.

In an embodiment, a queue 126 is maintained for optimizer 114 and is used to store data for new requests received when the optimizer is executing. Optimizer 114 may be paused at designated times to service the new requests in queue 126. The optimization process is described in further detail below.

In an embodiment, a server 210 implements the database for the scheduling system 100a. Server 210 includes an object manager 212, a data manager 214, and database 216.

Object manager 212 manages the interaction with the database and, in an embodiment, includes business objects (BO), business services (BS), and business components (BC) (not shown in FIG. 2A for simplicity). The business objects model major entities (e.g., activities) in the scheduling system with associated business rules. Each business object is made up of a hierarchy of parent-child components, which model relationship with appropriate specialized operations. The business services are the basic components for building complex behavior. New business services may be created and linked into multi-step control flows to provide complex behavior encompassing multiple business objects. The business components provide real time access to remote objects without replication of data within database 216. A business object may be made up of a number of business components managed by the scheduling system.

Data manager 214 manages database 216 and performs this function by invoking structured query language (SQL) objects. Database 216 stores all data related to the scheduling system, and possibly for other systems that may be combined with the scheduling system to provide the overall system.

Scheduling system 100a may be implemented to support one or more "processes". Each process may be defined to cover any number of service regions. In one implementation, system 100a is implemented over a number of servers, and each server may correspond to and supports a respective process. The processes may also be configurable (e.g., based on the requirements of the business enterprise for which the scheduling system is used).

Figure 2B:
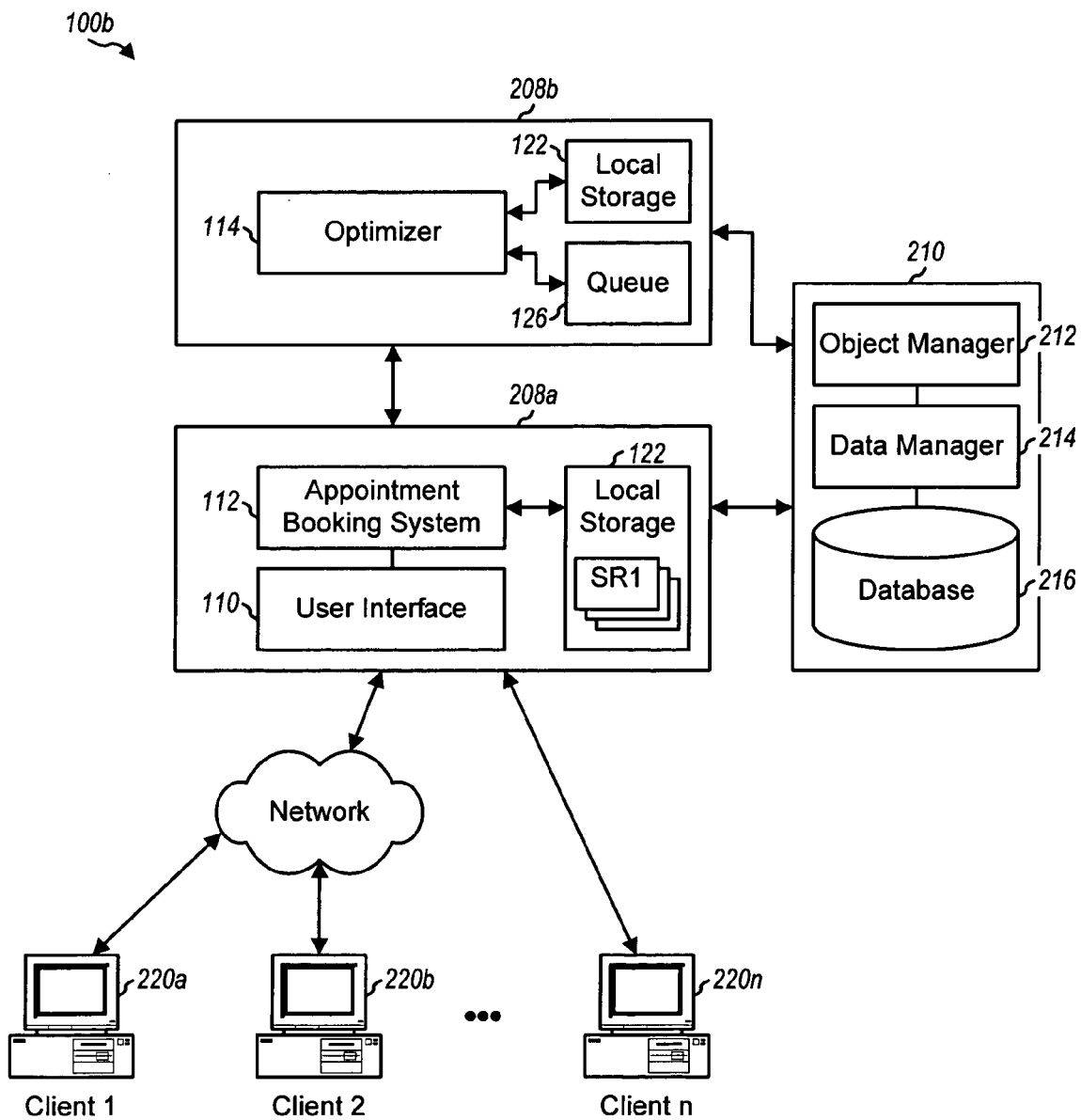

FIG. 2B is a diagram illustrating a distributed scheduling system 100b in which the modules of the scheduling system are implemented within multiple servers. As shown in FIG. 2B, appointment booking system 112 is implemented within a server 208a, and optimizer 114 is implemented within a server 208b. Each server 208 further includes a local storage to support the respective module(s) being implemented thereon. Interface with clients 220 is achieved via user interface module 110 on server 208a. The modules on servers 208a and 208b may communicate via exchanges of messages and further shares the data stored in database 216.

A large scale scheduling system may also be implemented, which may comprise a number of individual scheduling systems (e.g., each of which may be system 100a or 100b). Each individual scheduling system may cover a respective geographic area (e.g., a metropolitan area) and the overall scheduling system may cover a larger area (e.g., the western states, or the entire US). Each individual scheduling system may be implemented on a respective set of servers that couple to one or more clients. Each individual scheduling system may couple to a respective database, or a number of systems may couple to and share a common database. Each individual scheduling system may further couple to and interact with other individual scheduling systems.

Each individual scheduling system may be implemented to maintain the schedules for a respective group of service regions. In such an interconnected large scale scheduling system, each request to book, cancel, or change an appointment may identify the particular service region for the appointment. The request would then be routed to the appropriate individual scheduling system that maintain the schedule for that service region.

Figure 3A:
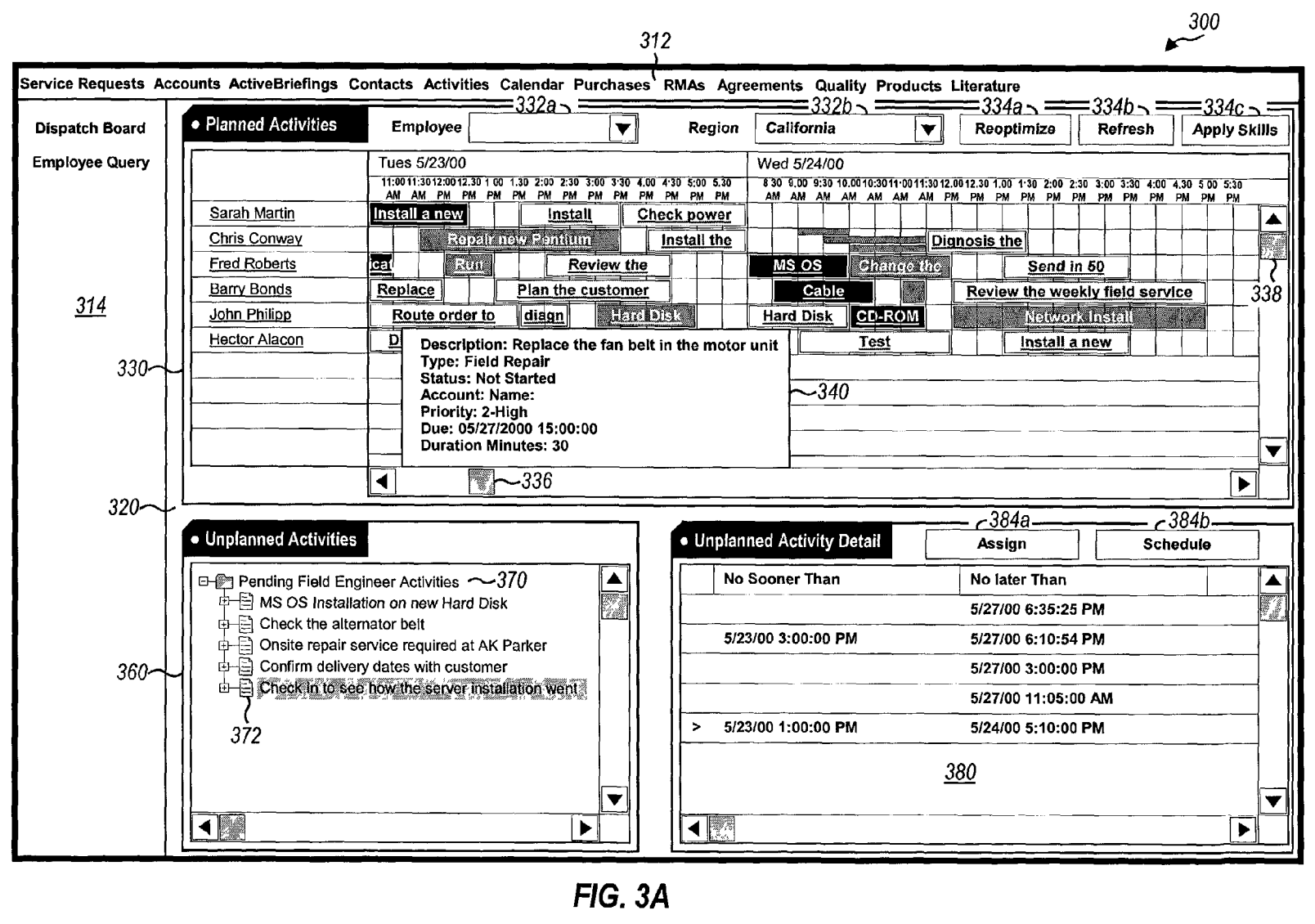

FIG. 3A illustrates a user interface menu 300 (also referred to as a dispatch screen) that may be used to display information for activities and resources for a schedule, and to facilitate the scheduling of activities, in accordance with a specific embodiment of the invention. Dispatch screen 300 may be provided to a user of the scheduling system to (1) show activities and employees in a service region, (2) provide capabilities to add, change, and schedule activities, (3) select and define various parameters used to book appointments and optimize schedules, and possibly to perform other functions. In an embodiment, dispatch screen 300 is used to support contract scheduling or to confirm appointments where choices are not provided. A fixed time slot may be automatically provided for an activity.

Dispatch screen 300 includes main pull-down menus 312, an application menu area 314, and a main display area 320. Main pull-down menus 312 may be used to invoke various modules, functionality, and features provided by an overall system. In such a design, the appointment booking system, optimizer, and contract scheduler may represent just three of many available modules. Application menu area 314 may be used to display icons and/or text representing various functions, features, and/or views available for the selected module. In the embodiment shown in FIG. 3A, the appointment booking system is selected for display.

Main display area 320 may be used to present information for the selected module. In the specific embodiment shown in FIG. 3A, main display area 320 presents information for the appointment booking system and includes a frame 330 used to display planned activities for a schedule, a frame 360 used to display unplanned activities in the schedule, and a frame 380 used to display unplanned activity detail for a selected unplanned activity. Different, fewer, and/or greater number of frames (or windows) may be selected for display in main display area 320. Also, the frames may be used to present different information and may have different designs and layouts.

FIG. 3A shows a Planned Activities frame 330 used to display a current schedule for a selected service region (e.g., California), in accordance with a specific embodiment of the invention. Frame 330 uses a Gantt chart, but other types of chart may also be used, and this is within the scope of the invention. The Gantt chart displays data on x and y-axis to show planned activities versus time. The two top rows of the chart display headers with date and time information. Each data row below the header rows may be used to display the schedule of a respective employee. The data to be presented in the rows may be based on the selected criteria (e.g., employee, service region, and so on).

The first column in the chart is a header column used to display the names of employees covered by the schedule. Each column to the right of the header column is a data column used to display assignment and scheduling information. Each data column covers a particular time period (e.g., one-half hour for the embodiment shown in FIG. 3A). The user may configure the chart (e.g., via an Option menu) to display a different time period (e.g., different number of days), in which case the time interval covered by each data column may change automatically.

Each cell in the chart is formed by the intersection area between one row and one column. Cells in the data columns may be configured to display data using colored boxes with outline. The data displayed in these cells may span multiple cells in the same row.

A Horizontal scroll bar 336 is provided to allow the user to span (or scan) across columns in the grid portion of the chart, i.e., the data columns. A Vertical scroll bar 338 may also be provided, if needed, to allow the user to scroll through the available employees across rows, except the header rows. The horizontal and vertical scroll bars may be made visible on the frame based on the amount of data to be displayed.

For frame 330, objects associated with the schedule to be displayed are initially loaded (e.g., from database 216) into the local storage. Such objects may include employee objects for the service region, activity objects associated with the service region, and other objects. Each object is then mapped to a logical representation in the chart. For example, each employee may be mapped to a row on the chart, and each activity for an employee may be mapped to a particular time interval in the row for which the activity may have been assigned and scheduled.

Various schemes may be used to present data in the grid portion of the chart (i.e., the data portion, except the header rows and column). In one scheme, data is displayed as solid colored boxes with outline. Each box represents a particular "event", which may be an activity that has been assigned and scheduled or some other information (e.g., non-schedulable or non-working times for an employee). The outline of a box typically corresponds to the time duration for the associated event (e.g., the scheduled time for an activity). The user may also be able to expand or shrink the size of a box by using the mouse (e.g., by clicking on an edge of the box and dragging the edge).

The color of each box may be based on a particular color coding scheme that uses different colors to differentiate between different types of event (e.g., different types of activity). For example, non-schedulable times for employees may be represented with boxes of one color (e.g., orange), scheduled activities may be represented with boxes of another color (e.g., green) or boxes of different colors to represent their status and priority, and so on. The color scheme may be configurable to suit the preferences of the individual user.

The data boxes may also be configured to display additional information related to the associated events. The additional information may be in text form and may be a concatenated string descriptive of the activity type, status, account, description, and so on, or a combination thereof. The boxes may also be configured such that full text is displayed in a box 340 for an event when the cursor is placed over the associated box.

Planned Activities frame 330 includes a number of list boxes 332 corresponding to a number of criteria that may be invoked to filter the information to be displayed in the frame. In the embodiment shown, an Employee list box 332a and a Region box 332b are provided in frame 330. Frame 330 further includes a number of buttons 334 used to invoke various functions supported by the appointment booking system. A Reoptimize button 334a may be used to invoke the optimizer to either optimize a new (raw) schedule or reoptimize a previously optimized schedule. A Refresh button 332 may be used to refresh of the contents of frame 330 to ensure that the data displayed in the frame (which is stored in the local storage) corresponds to the current data in the main database 216. The refresh may be invoked to load data for one or more employees and/or one or more service regions, and causes the current data to be deleted from the local storage and new data to be retrieved from database 216, processed, and stored to the local storage. An Apply Skill button 334c may be used to invoke an Assignment manager and refresh the Gantt chart with the details of employees returned by the Assignment manager. Employees may be restricted by matching the skills of the employees and the skills required for an activity. Fewer, additional, and/or different list boxes and buttons, or other representations, may also be provided, and this is within the scope of the invention.

FIG. 3A also shows an Unplanned Activities frame 360 used to display activities in the service region that are not assigned and scheduled, in accordance with an embodiment of the invention. Frame 360 displays a "tree control" in which the highest level includes a number of folders 370 (e.g., Pending Field Engineer Activities) for different types of pending activities. Each pending activity folder 370 includes zero or more unplanned activities 372 categorized under that activity type. The unplanned activities in frame 360 may be assigned and scheduled using a "drag-and-drop" technique described in U.S. patent application Ser. No. 09/810,007, entitled "System and Method for Assigning and Scheduling Activities," filed Mar. 16, 2001, now abandoned, assigned to the assignee of the present application and incorporated herein by reference.

FIG. 3A further shows an Unplanned Activity Detail frame 380 used to display details for an unplanned activity selected in frame 360. Frame 380 further includes an Assign button 384a that may be used to assign the activity and a Schedule button 384b that may be used to schedule the activity.

FIG. 3A shows a specific screen that may be provided to the user when the optimizer is invoked. Other screens may also be provided for other modules.

Figure 3B:
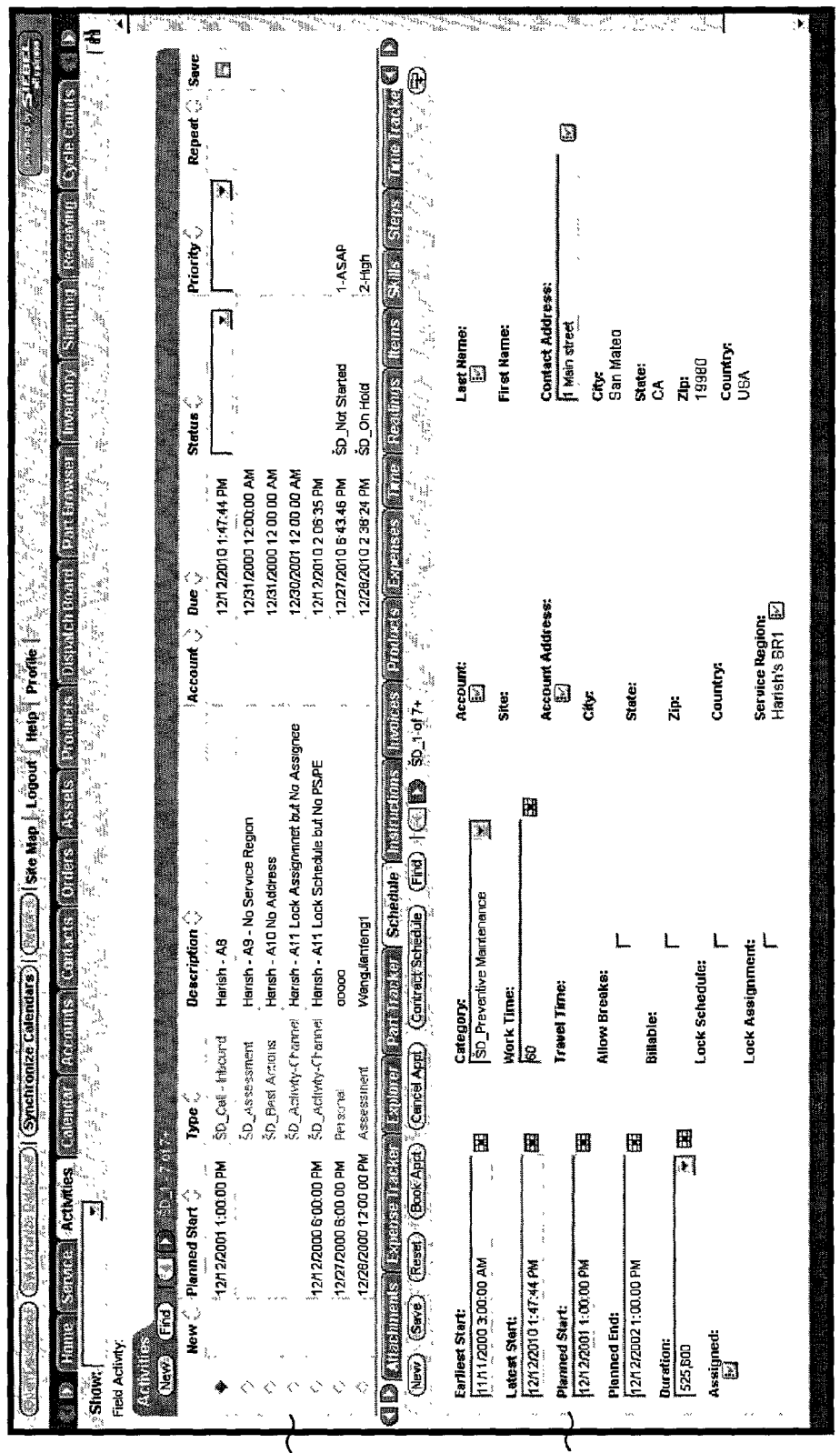

FIG. 3B illustrates a user interface menu 390 (referred to as an appointment booking screen) that may be used to display information for activities when the appointment booking system is invoked. Screen 390 includes a frame 392 that lists a number of activities and a frame 394 that list more detailed information for a selected activity. Any one of the activities in frame 392 may be selected, in which case the detailed information for the selected activity is presented in frame 394.

Frame 394 may be used to enter, edit, or view specific details for the selected activity. Such details includes the no-sooner-than time (i.e., "earliest start"), no-later-than time (i.e., "latest start", scheduled times (i.e., "planned start" and "planned end") if any, the expected duration for the activity (i.e., "work time"), and other information. Frame 394 further includes a "Book Appt" button that allows the selected activity to be booked, a "Cancel Appt" button that allows a booked activity to be canceled, a "Contract Schedule" button that allows for contract scheduling of an activity, and other buttons that support other functions.

FIG. 4 is a timing diagram for a schedule, in accordance with an embodiment of the invention. The time horizon for a schedule may be partitioned into a number of time segments to facilitate the booking, optimization, and dispatch of the schedule. In the embodiment shown in FIG. 4, the time horizon includes a "glued" time segment 412, an "optimized" time segment 414, and a "booking" time segment 416. Fewer, additional, and/or different time segments may also be defined, and this is within the scope of the invention.

Glued time segment 412 includes the time period from $t_1$ to $t_2$, which typically covers the current and near term time periods. For example, glued time segment 412 may cover a 24-hour time period starting from now. Glued time segment 412 may be used to denote the time period for which the schedule is fixed and not allowed to change due to a re-optimization. However, the glued portion of the schedule may be allowed to change to handle emergencies and other events, as described in further detail below.

Optimized time segment 414 includes the time period from $t_2$ to $t_3$, which covers a particular time period after the glued time segment. For example, optimized time segment 414 may cover the next 48-hour time period after the glued time segment. Optimized time segment 414 may be used to denote the time period in which the schedule has been optimized for improved efficiency and cost. The local storage (i.e., the cache) for the optimizer may be loaded with data covering the time period from $t_1$ to $t_4$, and this data or a portion thereof may be used to produce an optimized schedule covering the time period from $t_2$ to $t_3$. The reason for loading data covering a short time period before and after the optimized time segment is to ensure that activities overlapping multiple time segments are properly processed in the optimization.

Booking time segment 416 includes the time period from $t_3$ to $t_5$, which covers a particular time period after the optimized time segment. For example, booking time segment 416 may be the next two-week time period after the optimized time segment. Booking time segment 416 may be used to denote the time period in which new appointments may be booked. The local storage for the appointment booking system may be loaded with data covering the time period between $t_3$ and $t_5$, which may be processed and used in booking new appointments.

Appointment Booking System

In an embodiment, the appointment booking system supports the following features and functionality:
Load and reload data from the database for each supported service region.
Process the loaded data to generate the schedule for each supported service region.
Refresh data for the service regions.
Insert new employee into a particular service region and transfer an employee from one service region to another.
Remove an employee from a service region.
Reschedule activities in response to insertion, removal, and transfer of employees.

The appointment booking system further supports the following:
Make new appointments.
Cancel appointments.
Change appointments (cancel and/or add appointments).

Figure 5A:
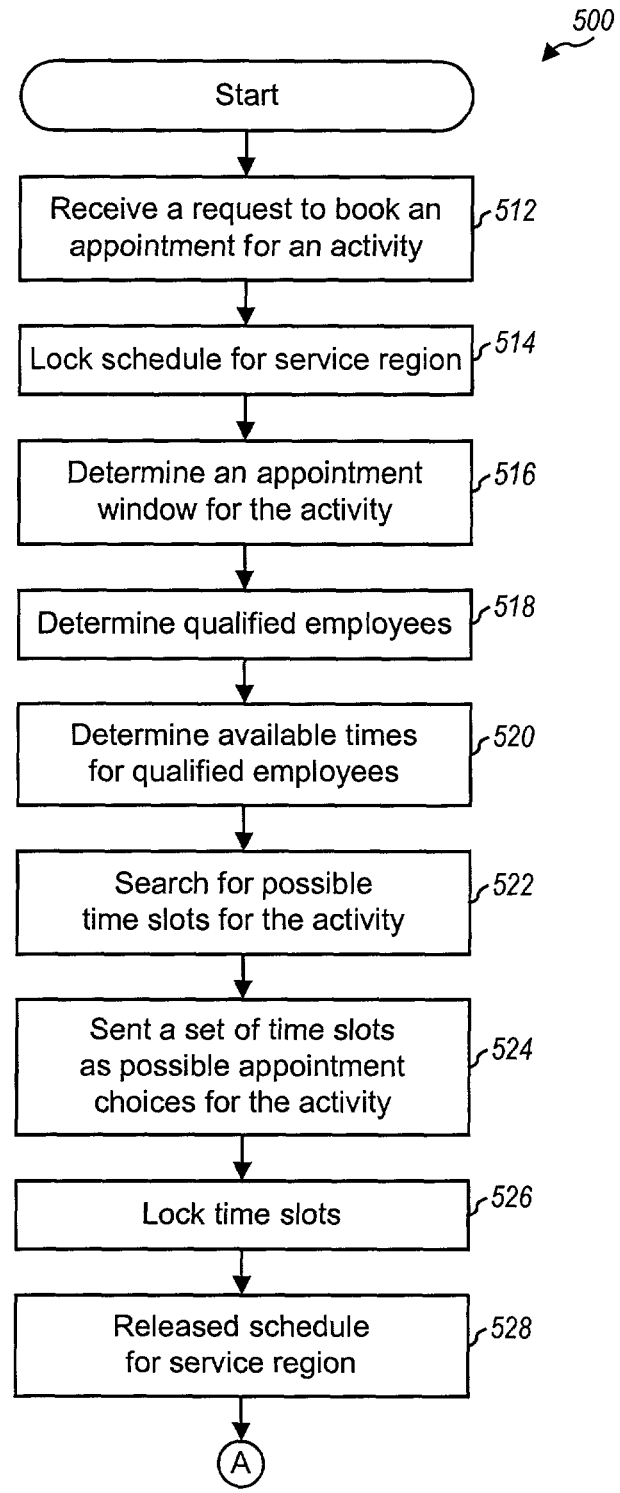
FIGS. 5A through 5D show flow diagrams of processes for booking a new appointment for an activity, canceling an appointment, and changing an appointment, in accordance with an embodiment of the invention.
Figure 5B:
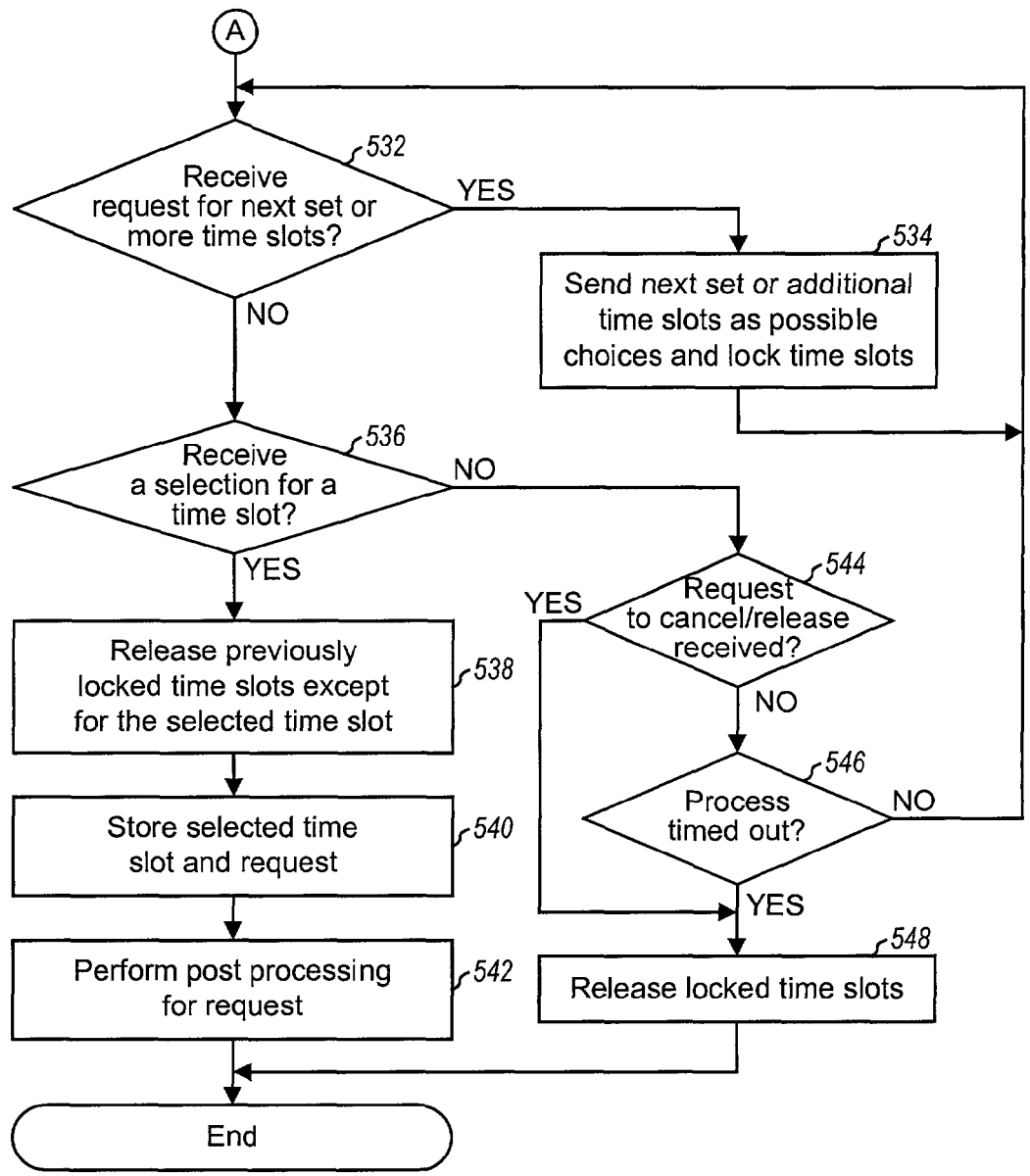

FIGS. 5A and 5B show a flow diagram of an overall process 500 for booking a new appointment for an activity, in accordance with an embodiment of the invention. Many or all of the steps in process 500 may be performed by the appointment booking system.

Initially, a request is received from a particular client 220, at step 512. The request may relate to the booking of an appointment for an activity in a particular service region, and may include the time constraints for the activity such as the no-sooner-than time, the no-later-than time, and the expected duration for the activity. The request may include other requirements for the activity such as the required skills and parts. In an embodiment, the request also includes information indicative of the particular service region to which the activity should be scheduled, which may be determined by the location (i.e., address) where the activity is to be performed. The service region may be (1) specifically indicated in the request, (2) indirectly provided based on the particular client through which the request is received, or (3) provided via some other means.

The request may be generated in various manners. For example, a customer may call into a call center and interact with a customer service representative, who may analyze the situation, takes information from the customer, and generates one or more requests for one or more activities appropriate for the call. Alternatively, the request may be received directly from a customer (e.g., via a web site maintained to receive such request).

In response to receiving the request, the schedule for the service region is temporarily locked, at step 514. This prevents other processes from modifying the data for the service region while it is being manipulated by the appointment booking system for this request. This locking mechanism ensures data integrity.

A booking window ($t_{WINDOW}$) for the activity is then determined, at step 516. The booking window may be determined by the appointment booking system (as indicated in FIG. 5A) or may be provided with the request. In an embodiment, the booking window is based on the time expected to be required for the activity (i.e., $t_{WINDOW} \propto t_{REQ}$). The booking window may also be based on the importance of a customer (e.g., a privileged customer may get smaller time window). In an embodiment, the expected required time is further based on the expected duration for the activity plus travel time (i.e., $t_{REQ} = t_{ACT} + t_{TRAVEL}$). The expected activity duration may be specified in the request (e.g., in the duration time field). Alternatively, the expected activity duration may be determined, for example, based on the type of activity being scheduled. A table that associates each activity type to an average time required to complete the activity may be used. In an embodiment, the travel time is a particular amount time that may be fixed (e.g., half hour) for the service region, and may also be made selectable via the Option menu.

As an example, one hour may normally be needed to complete a particular activity type, a half hour may be added for travel time, and a four-hour booking window may be used for the activity. This booking window may be viewed as the time period during which a field service personnel (or employee) may be expected at the site to perform the activity.

A list of qualified employees in the service region with the right capabilities for the activity is then identified, at step 518. An employee may be deemed qualified for the activity if the employee possesses the required skills, tools, parts, and other attributes that may be specified in the request.

The available times for each qualified employee are next determined, at step 520. If the request specifies time constraints (e.g., the no-earlier-than and/or no-later-than time), then these time constraints may be applied in the search for the available times. Otherwise, the entire time period over which the activity may be scheduled (i.e., the booking time segment) may be searched for the available times. The expected required time for the activity ($t_{REQ}$) or the expected activity duration ($t_{ACT}$) may also be used to exclude available times that do not meet this time requirement.

Time slots in which the activity may be booked are then searched, at step 522. Each time slot is a window of a particular duration during which the activity may be scheduled to be performed (i.e., the time during which a field service personnel may come and perform the activity). In an embodiment, the duration of the time slots is set equal to the booking window, which is based on the expected required time for the activity. The possible time slots for the activity are thus selected based on various criteria such as the required skills and parts for the activity, the imposed time constraints, the availability of the employees, and so on.

In an embodiment, the total time during which activities may be scheduled for each employee (e.g., the employee workday) is partitioned into consecutive time slots. For example, if the appointment window is two hours and the workday is from 8 AM to 5 PM, the total time may be partitioned into four time slots of 8-10 AM, 10-12 PM, 1-3 PM, and 3-5 PM. If the expected required time for the activity ($t_{REQ}$) falls into a particular available time, then the corresponding time slot for that available time is returned as available time slots for appointment. For the above example, if the expected required time for the activity is one hour and the available times for an employee is from 9:30 AM to 11 AM and from 3 PM to 4 PM, then time slots of 8-10 PM and 3-5 PM are provided as available time slots for appointment.

Based on the results of the search, time slots are identified as possible choices for an appointment. A set of one or more time slots found in the search is then sent to the requesting client 220 as possible appointment choices for the activity, at step 524. The set of time slots sent to the requesting client may be a subset or all of the time slots found in the search.

Any one of a number of heuristic selection schemes may be used to select the available time slots for inclusion in the set. These schemes may include an earliest first scheme, a resource loading scheme, a resource leveling scheme, and possibly others. In the earliest first scheme, the earliest available time slots are included in the set. This scheme may provide the fastest possible response time for the activity. In the resource loading scheme, time slots are selected such that the schedules for employees are filled to the extent possible, one employee at a time. If two or more qualified employees are available, the time slots for the employee with the most complete (i.e., filled-up) schedule are selected for inclusion in the set. And in the resource leveling scheme, time slots are selected such that the schedules for the qualified employees are evenly loaded, to the extent possible. The number of time slots to be returned in response to the request may be selected (i.e., configurable) via and Administration screen.

In an embodiment, the available time slots are temporarily locked, at step 526. The particular time slots to lock can be dependent on the particular implementation and/or operating mode of the appointment booking system, which may be configurable. In one locking scheme, all available time slots found in the search are temporarily locked, even the time slots not returned to the requesting client. This scheme may expedite processing if additional choices are subsequently requested, since a second search may be avoided. In another locking scheme, only the time slots returned to the requesting client are temporarily locked, and other available time slots found in the search are released. This scheme may be preferred, to free up the time slots for subsequent requests. In yet another locking scheme, the available time slots not returned to the requesting client may be temporarily locked for a shorter time period, in case additional choices are subsequently requested. Other locking schemes for the time slots may also be implemented, and this is within the scope of the invention.

The schedule is then released (i.e., unlocked), at step 528.

Thereafter, another request from this or another client 220 may be received for the same schedule. If and when this occurs, the schedule is temporarily locked, and possible time slots for the activity are searched. The time slots locked by previous requests are not available for this request. The time slots found for this request are also temporarily locked, and a set of one or more time slots found for this request is sent to the requesting client. This processing can be performed for each new request received by the appointment booking system.

The time slots sent to a requesting client in response to a request to book a new appointment may not be acceptable or desirable for any number of reasons. A determination is thus made whether or not a request for a "next set" of time slots, for more choices, has been received from the client, at step 532. If such a request is received, another set of time slots found in the previous search but not yet sent may now be sent to the client, at step 534. Alternatively or additionally, another search may be performed to find new time slots, which may have become available since the last search. Again, the next set of time slots to be sent may be a subset or all of the currently available time slots, and may include the same or different number of time slots included in the previous set returned to the client. The next set request may be used if the time slots returned in the previous set are unacceptable.

Alternatively, a request for "more" time slots may be received at step 532. If such a request is received, additional slots may be returned along with the time slots returned in the previous set (or in all prior sets). The more request may be used if the time slots returned in the previous set are undesirable, but may turn out to be the best ones available. For both the next set and more requests, only the time slots sent to the requesting client or all time slots found in the search for the request may be temporarily locked, depending on the time slot locking scheme being implemented.

The process can continue in this manner and any number of additional requests may be received for more time slot choices. In response to each received request, the next set or additional time slot choices may be sent to the requesting client, if available. Steps 532 and 534 may thus be repeated any number of times, until the desired or acceptable time slots are provided.

One of the time slots previously sent to the requesting client may be selected, and a message indicating the selection may be received from the client, at step 536. If the selection is received, all previously locked up time slots for the request, except for the selected time slot, are released, at step 538. The selected time slot and request are then sent to the database, at step 540. Other post processing may also be performed for the request, at step 542. For example, an acknowledgment and a confirmation number may be sent to the requesting client, and the affected employee may be notified.

If a selection is not received from the requesting client at step 536, a determination is made whether or not a request to cancel or release the time slots was received, at step 544. If such a request is received, the process proceeds to step 548 and all time slots are released.

In an embodiment, the time slots found for a request are temporarily locked for a particular "timeout" or locked-up period (e.g., several hours). If a selection for a time slot or a request to cancel/release is not received within the timeout period, the locked time slots automatically become available for other requests. This mechanism ensures that time slots are not indefinitely locked up and are subsequently made available for other requests. Thus, if a response is not received from the requesting client, a determination is made if the process for this request has timed out, at step 546. If the process has not timed out, it returns to step 532 to determine whether a request for the next set or more time slots have been received. Alternatively, the process may return to step 536 to wait for a selection. Otherwise, if the process has timed-out at step 546, then the locked up time slots are released, at step 548, and the process terminates.

Various checks may be made on a request prior to attempting to book an appointment. For example, the request may be check to ensure that (1) it contains a valid service region, (2) the no-later-than time and no-sooner-than time are within the time segment for which new appointments may be booked, and (3) all required information are present. If any one of these conditions is not met, then an error may be generated and provided to the requesting client. Alternatively, the check may be performed at the client prior to sending the request to the appointment booking system.

Various parameters may be considered in the search for suitable time slots for a request. These parameters may include, for example, system parameters, "tunable" parameters, exceptions, and others.

System parameters include parameters used by the appointment booking system such as the duration for the time slots. In an embodiment, there is a mapping between the expected activity duration and the appointment window duration (e.g., a 1-hour activity may be mapped to a 4-hour appointment window). This parameter may be defined by the user.

Tunable parameters include parameters that may be selected for a particular process. For example, a number of heuristic selection schemes may be available for selecting time slots to be returned to the requesting client. The desired selection scheme may be selected via the Administration screen provided for the appointment booking system.

Exceptions include time periods during which activities cannot be scheduled. Various classes of exceptions may be defined, and each exception class may cover a requests group of employee(s). For example, exceptions in a first class may apply to individual employees and may be used to denote personal vacations, planned absences, and unplanned sick times. Exceptions in a second class may apply to a group of employees (e.g., employees in a service region or a portion of the service region) and may be used to denote events applicable to the group (e.g., all-hands meeting). Exceptions in a third class may apply to all employees and may be used to denote national and company holidays and so on. Various other classes may also be defined and used.

Exceptions may be associated with hard or soft values. A hard value indicates whether or not activities may be scheduled (i.e., a yes or no decision). A soft value may indicate the cost associated with the scheduling of an activity during the covered time period. For example, it may be preferable not to schedule an activity during overtime period for an employee, but the activity may nevertheless be scheduled, for example, if there is an emergency or if a higher cost is acceptable. Each employee may be associated with any number of exceptions of any class and type.

At the client, a menu may be provided to show the possible options available for a request. These options may include (1) confirm one of the time slot choices as the selected appointment, (2) reject all choices, (3) get next set of choices, (4) get "n" more choices, and possibly others. Confirming a choice causes the selected time slot to be marked as the appointment and releases the other locked-up time slots. Rejecting all choices releases all locked-up time slots. In an embodiment, getting the next set of choices unlocks the first set of choices and triggers a search for another set of choices that are different from the ones previously provided (e.g., a table may be maintained by the appointment booking system to keep track of which time slots have already been sent for the request). And getting more choices results in the current choices being kept and n additional choices to be provided, if these are available.

Figure 5C:
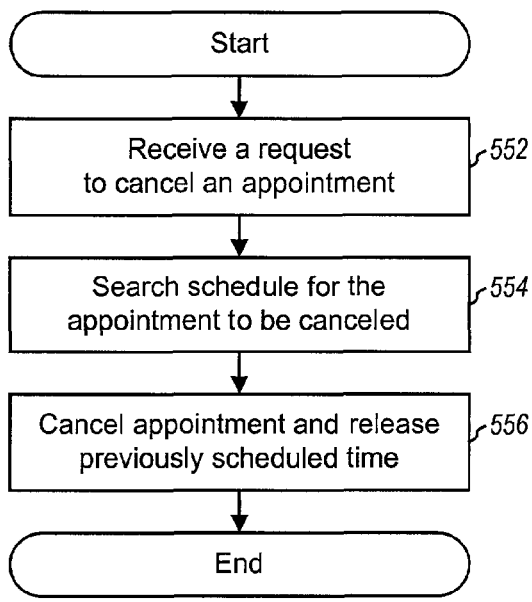

FIG. 5C is a flow diagram of an embodiment of a process for canceling a previously booked appointment, in accordance with an embodiment of the invention. Initially, a request to cancel an appointment is received by the appointment booking system, at step 552. The request includes sufficient information to allow the appointment booking system to identify the appointment. This information may include the particular service region, employee, and time slot for the appointment. Alternatively, this information may include a confirmation number previously assigned for the appointment.

The schedule for the service region is searched and the appointment is identified, at step 554. Depending on the particular time segment in which the appointment is located, the appropriate module is then invoked to process the cancellation. For example, if the appointment to be canceled is in the booking time segment, then the appointment booking system can perform the processing to cancel the appointment. But if the appointment to be canceled is in the glued or optimized time segment, then the optimizer may be invoked to cancel the appointment. The appointment booking system and optimizer may both be invoked for an appointment that overlaps two time segments.

The appointment is then canceled from the schedule, and the scheduled time is released and made available for other requests, at step 556. If the appointment falls within the booking time segment, the appointment booking system may readjust the schedule to account for the canceled appointment. And if the appointment falls within the glued or optimized time segment, the optimizer may re-optimize the schedule.

Figure 5D:
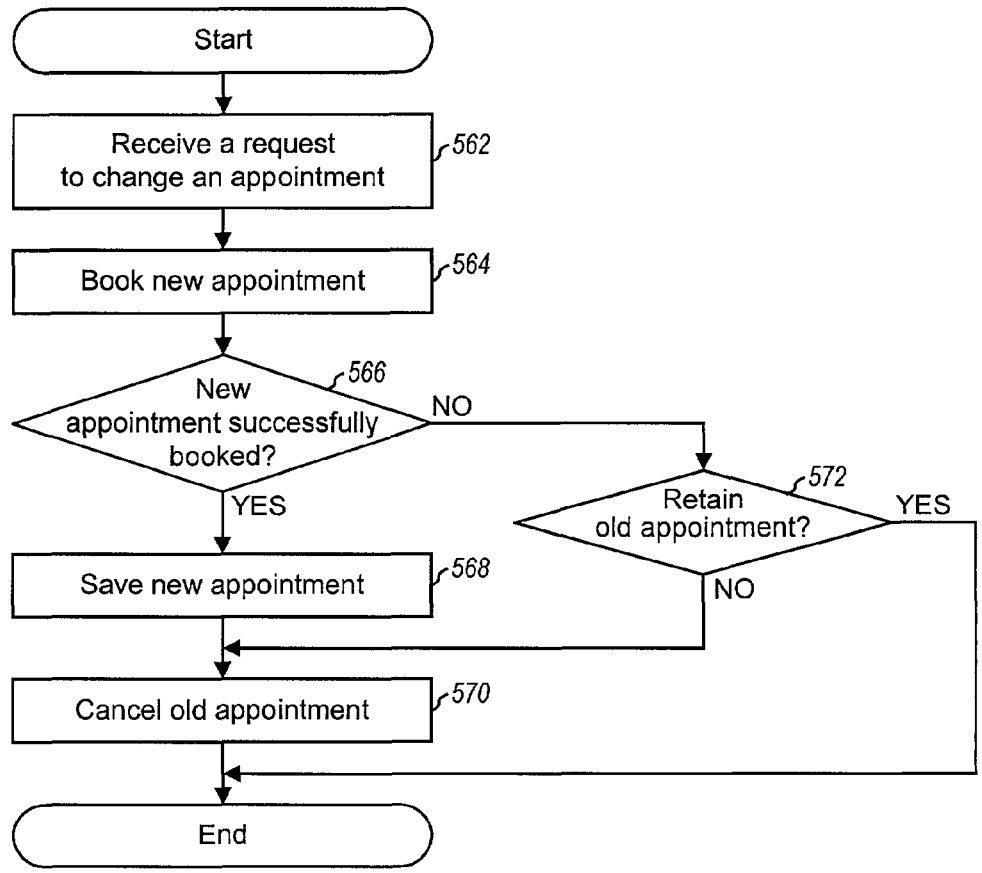

FIG. 5D is a flow diagram of an embodiment of a process for changing a previously booked appointment, in accordance with an embodiment of the invention. Initially, a request to change an appointment is received by the appointment booking system, at step 562. Again, the request includes sufficient information to allow the system to identify the appointment. The request may also include information that may be used to book the activity, such as the time constraints and other requirements.

A new appointment is then booked for the request, at step 564. This may be achieved in the manner described above for FIGS. 5A and 5B. If a new appointment is successfully booked, as determined in step 566, then the new appointment with the selected time slot is accepted and entered in the schedule, at step 568. The previously booked appointment is canceled and the scheduled time is released and made available for other activities, at step 570. Messages may also be sent to the optimizer, which may re-optimize the schedule to account for the canceled and new appointments.

At step 566, if a new appointment has not or cannot be booked, then the client may elect to retain the old appointment, as determined at step 572. In this case, the process terminates. Alternatively, the client may elect to cancel the appointment without booking a new appointment, which then causes the previously booked appointment to be canceled and the scheduled time released, at step 570.

The appointment booking system may be used to schedule and maintain appointments for service regions spanning multiple time zones. In an embodiment, times for the schedules are maintained using a universal time code (UTC) to avoid ambiguity with different time zones. In an embodiment, the universal time code is based on Greenwich Mean Time (GMT). In an embodiment, the time constraints in the requests sent from the clients are based on UTC, and the time slots sent back to the clients are also based on UTC. The clients perform the conversion from local times to UTC and vice versa. Alternatively, the appointment booking system may perform the conversion from UTC to local time.

Table 5 lists various parameters that may be used by appointment booking system.

TABLE 5

| Booking Module Parameters | Values |
|---|---|
| Week Start Day | Day of the week when week starts (1-Monday) |
| Month Start Date | Day of the month when our month start |
| Tolerance | Value defining the response to unscheduled and failed activities |
| Use Assignment Manager | 0-Don't use Assignment Manager for eligible employees<br>1-Use Assignment Manager for eligible employees |
| Days to Start | The number of days from current time to the start of the booking time segment |
| Days to End | The number of days from current time to the end of the booking time segment |
| Default number of time slots | The number of time slots to be returned to the requesting client during a 'Book Appointment' action |
| Activity Category | Only activities with the specified categories are loaded and operated on by the appointment booking system |
| Logging Level | Different degrees of event logging |
| Timeout | The maximum time (in minutes) an unconfirmed booking is kept in the system before the time slots are released |
| Selection Heuristic | Heuristic for selecting the time slots to return to the client<br>1-Earliest First<br>2-Resource Leveling<br>3-Resource Loading |

FIG. 6 is a state diagram that illustrates the possible states for an activity, in accordance with an embodiment of the invention. Upon receiving a request to book an appointment for an activity, the activity is placed in an open state 612. Once the activity has been booked, the activity transitions to an approved state 614. In an embodiment, activities in booking time segment 416 are in scheduled state 616.

In an embodiment, activities in optimized time segment 414 are in the scheduled state. For certain type of activities (e.g., "service contract" activities, described below), an approved activity may transition directly to a dispatched state 618 and bypass the scheduled state.

A scheduled activity is eventually considered for dispatch, in which case it enters a dispatched state 618. In an embodiment, activities in glued time segment 412 are in the dispatched state. If the activity is subsequently performed in a satisfactory manner, it enters an accepted state 620. After final processing (e.g., for overhead, customer survey, and so on) has been performed for an accepted activity, it enters a closed state 622.

If the activity in dispatched state 618 is not performed (e.g., due to an emergency such as a vehicle breakdown) or is performed in an unsatisfactory manner, it enters a rejected state 624. A rejected activity may transition to closed state 622 if no additional work is desired, or may transition to an unscheduled state 626. If an appointment is booked for the unscheduled activity, it enters scheduled state 616. Otherwise, the unscheduled activity may be terminated and enters closed state 622.

Similarly, a scheduled activity may be canceled, in which case it transitions from scheduled state 616 to closed state 622. A scheduled activity may also transition to unscheduled state 626, for example, if some unexpected event comes up (e.g., an employee is out sick or a vehicle breaks down) and the activity has to be rescheduled.

FIG. 6 shows a specific set of states that may be used to represent the current state of an activity. Additional, fewer, and/or different states may also be used, and different mechanisms may be provided to transition between the defined states. These and other variations are within the scope of the invention.

Optimizer

An activity is booked in a time slot that typically exceeds the expected duration for the activity (e.g., a one-hour activity may be booked in a four-hour time slot). Moreover, the focus in the initial booking may be to assign a future time window, and not on creating an optimum schedule since appointments may be continually added, canceled, or changed. The original appointments may thus provide a rough schedule of the activities for a service region. The optimizer may be executed to provide a more optimum schedule for the service region.

The optimization may be performed for a group of activities, which may be selected based on their categories, types, status, and so on. Activities may be categorized into any number of categories such as, for example, field service, preventive maintenance, repair, normal, and others. Each category may further be defined to include any number of types. For example, the field service category may be defined to include installation, meeting, call, do to, and so on. The selection criteria may be configurable by an operator of the scheduling system.

Figure 7:
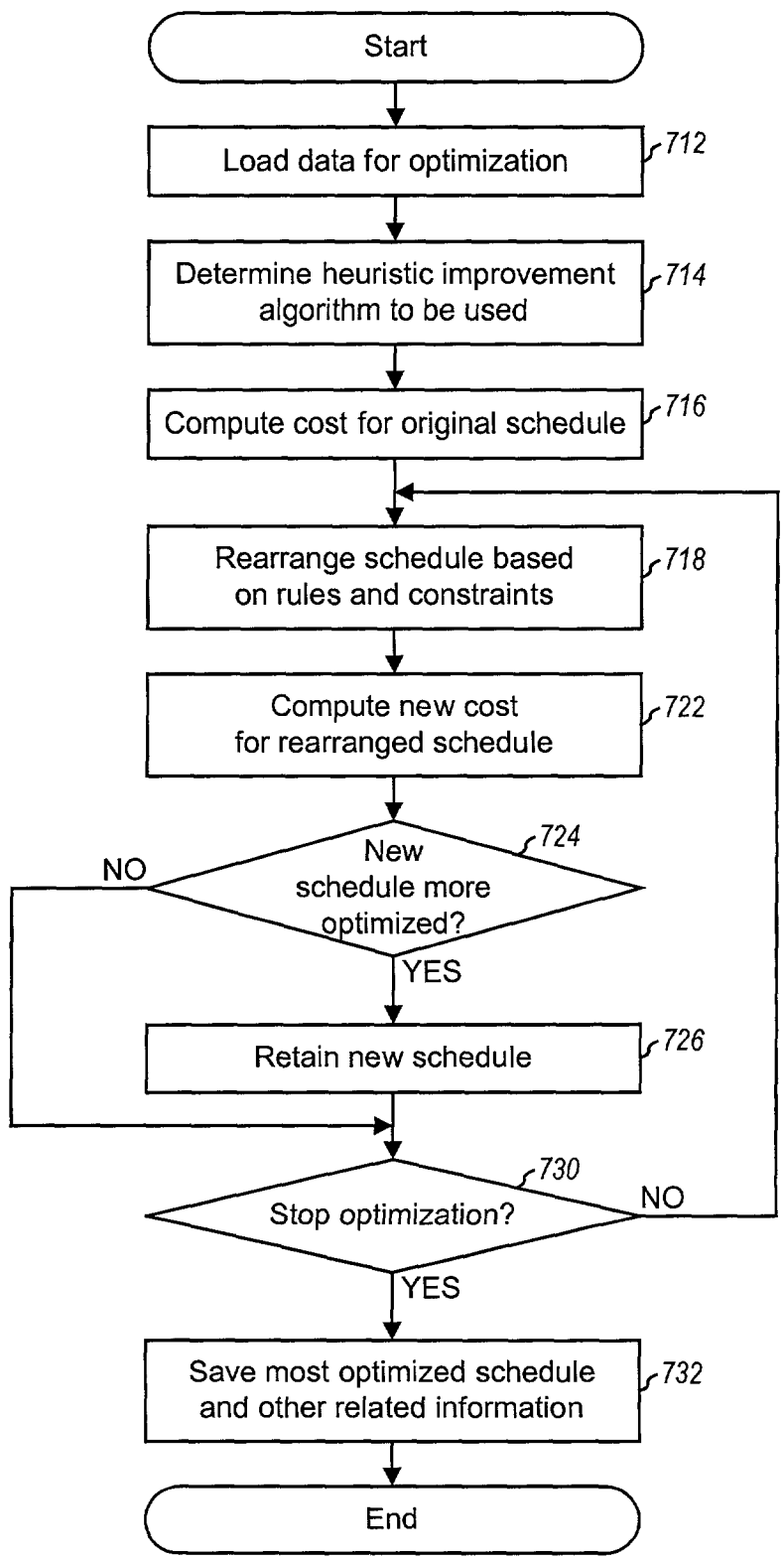
FIG. 7 is a flow diagram of an optimization process, in accordance with an embodiment of the invention.

FIG. 7 is a flow diagram of an optimization process, in accordance with an embodiment of the invention. Initially, data for the optimization is retrieved and loaded into the local storage for the optimizer, at step 712. This data covers the optimized time segment and a period of time before and after this time segment. The data typically also includes the activities and their constraints, employees and their capabilities and availability, and rules, constraints, and parameters that may affect the optimization process. The particular heuristic improvement algorithm to be used for the optimization is also determined, at step 714. The heuristic improvement algorithm to be used for this optimization may be selected from among a number of possible algorithms.

A cost is then computed for the original schedule, which may correspond to the originally booked appointments, at step 716. This cost is a function of a number of variables (or parameters) and their associated values (i.e., weights). The cost function may be defined to achieve one or more goals (e.g., to minimize the cost of travel, overtime, and so on), and is described in further detail below.

The schedule is then rearranged based on the rules and constraints, at step 718. The schedule may be rearranged using improvement heuristics, by trial-and-error, and any other mechanism. In rearranging the activities in the schedule, the current scheduled time for each activity may be ignored, and the expected duration for the activity and the appointment window are considered. For example, an activity may be currently scheduled for 2 to 3 PM but the appointment window may be between 1 and 4 PM. This activity may thus be scheduled at any time between 1 and 4 PM without consideration of the current scheduled time of 2 to 3 PM.

In rearranging the activities in the schedule, the constraints for employees are also considered. Thus, activities are assigned to qualified employees (e.g., with the proper skills, tools, and parts). Moreover, the activities are scheduled based on the availability of the employees, which may be affected by exceptions (e.g., personal time off, company wide holidays).

A new cost is then computed for the rearranged schedule, at step 722. Based on the new cost, prior cost(s), selected heuristic improvement algorithm, and possibly other factors, a determination is made whether or not the new schedule is a more optimized schedule, at step 724. The new schedule is retained if it is more optimized, at step 726. Otherwise, the prior schedule is retained and the new schedule is discarded. In an embodiment, a portion of a schedule may be glued during the optimization process. The particular portion to be glued may be determined by a system parameter, which may be set to a particular duration (e.g., four hours). In an embodiment, the schedule is glued for the glued time segment plus this particular duration.

A determination is then made whether or not the optimization process should terminate, at step 730. The optimization may be selected to be performed for a particular time period (e.g., two hours), for a particular number of iterations, until a particular cost has been obtained, based on some other termination criterion, or a combination thereof. If the optimization is to be continued, the process returns to step 718 and another iteration is performed. Otherwise, the most optimized schedule, its cost function, and other information related to the schedule are saved, at step 732. The process then terminates.

As noted above, a set of rules and constraints may be used in the optimization process (e.g., to rearrange the activities). The rules may be grouped into a number of categories such as, for example, employee rules, activity rules, schedule rules, and possibly others. Employee rules dictate the conditions of the employees being scheduled. Activity rules specify the constraints for each activity being scheduled. And schedule rules dictate the requirements for the overall schedule. Each rule may be a hard or soft rule.

Table 6 lists some of the rules that may be applied during the optimization process. These rules are provided by way of illustration. Fewer, additional, and/or different rules may also be used, and this is within the scope of the invention.

TABLE 6

| Rule | Values |
| --- | --- |
| Employee vs Schedule | Covers requirements for employees against the schedule (e.g., minimum of 30 hours per week for full time employees) |
| Employee vs Activity | Covers requirements for employees against a particular activity. Different types include: |

TABLE 6-continued

| Rule | Values |
| --- | --- |
| | 1-work time rules |
| | 2-work amount rules |
| | 3-work type rules |
| | (e.g., employee assigned to preventive maintenance should not be scheduled for repairs) |
| Activity vs Schedule | Allows user to set what activities or types should be dropped from a schedule in an exception scenario |
| Activity vs Value | Allows user to set what activities or types should be dropped in an exception scenario. Different types include: |
| | 1-activity timing rules |
| | 2-activity order rules |
| | 3-activity assignment rules |
| Schedule vs Time | Rules that compare the overall schedule to user-defined constraints (e.g., total overtime for service region cannot exceed 50 hrs per month) |
| Implicit rules | Set by the system automatically and not the user |

In accordance with an aspect of the invention, a cost is used to rate the optimality of a schedule, and may further be used to (1) rearrange the activities in the schedule and (2) search for and identify a more optimum schedule. The cost is computed as a function of a number of variables (or parameters), which may be defined and enabled by the system or user. These parameters may include, for example, the distance between activities for a particular employee, the tardiness in an activity's scheduled time, constraints (or rules) for each employee/activity/schedule, activity exclusion rules, costs associated with overtime for employees, and so on.

Each parameter may be associated with a respective weight. Constraints may be hard or soft. For example, a hard value may be assigned to the availability of employees due to personal vacation or company holidays, and a soft value may be applied to the availability of employees for overtime. Penalties may also be assessed for violations of constraints.

Table 7 lists some of the parameters that may be considered in the cost function. Cost may be computed as a sum of the parameter values multiplied by their associated weights.

TABLE 7

| Cost Function Parameters | Values |
| --- | --- |
| Employee Overtime | Weight of Employee Overtime in the cost function |
| Travel Distance | Weight of Travel Distance in the cost function |
| Activity Exclusion Penalty | Weight attached to omitting an activity from the schedule |
| Constraint Violation | Weight of Constraint Violation in the cost function |
| Tardiness | Weight of having an activity miss its due date |

In an embodiment, each parameter is "normalized", as necessary and to the extent possible, for used in the cost function. For example, one currency may be used for all employees considered for the optimization.

The heuristic improvement algorithms represent methods used to select the more optimum schedule during the optimization process. Various heuristic improvement algorithms may be used to perform the optimization, such as those listed in Table 8. These algorithms are known in the art and not described herein.

The particular heuristic improvement algorithm that provides the best results may be dependent on the particular distribution of the data. Thus, different heuristic improvement algorithms may provide better results for different data distribution environments.

The optimization process can take a relatively long time to complete (e.g., hours) and is thus typically performed during off hours. In an embodiment, to simplify processing, the optimization is performed individually for each service region, i.e., one schedule at a time. The optimization may also be performed for a particular group of selected activities.

Figure 8:
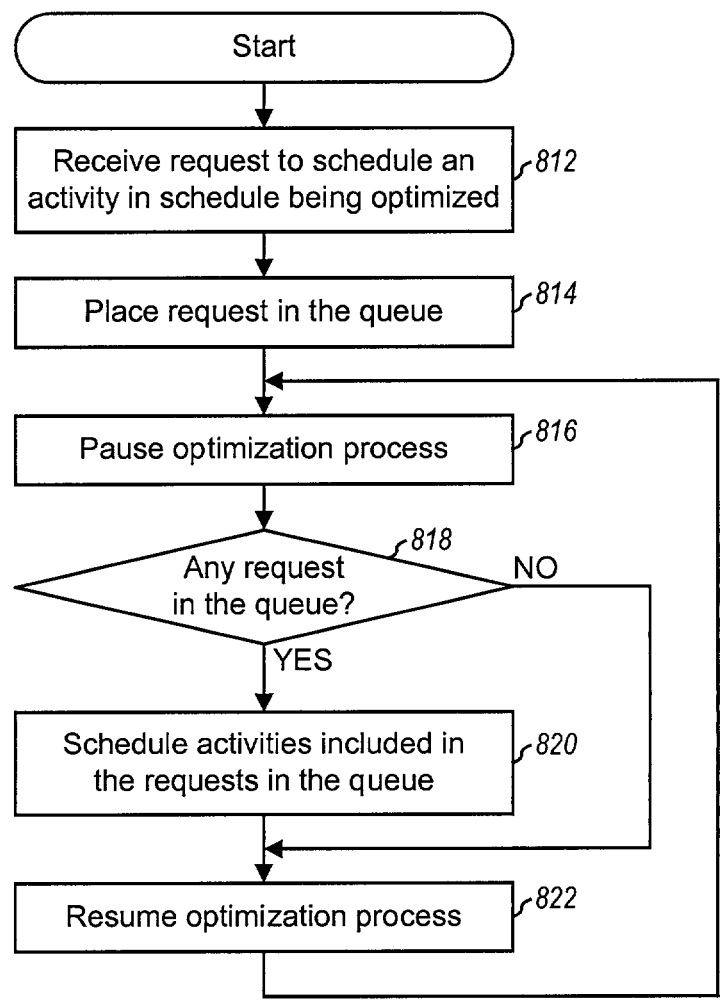
FIG. 8 is a flow diagram that illustrates the interruption of the optimization process to include new activities in a schedule being optimized.

FIG. 8 is a flow diagram that illustrates the interruption of an optimization process to include new activities in a schedule being optimized. In an embodiment, a schedule is not made available during the optimization process. This reduces interruptions, which may expedite the optimization process.

At step 812, a new request is received (e.g., by the scheduling system) for the schedule during the optimization process. If the activity in the request needs to be scheduled in the time segment being optimized (e.g., a contract service activity), the request is placed in a queue, at step 814. Requests for appointments in other time segments are routed to other modules (e.g., the appointment booking system) and do not affect the optimization process.

Periodically, the optimization process is interrupted, at step 816, and the queue is checked to determine whether or not any request is in the queue, at step 818. If there are requests in the queue, the optimizer attempts to schedule the activities included in the requests, at step 820. This may require certain activities to be rearranged in the schedule. The optimization process is then resumed with the newly added activities, at step 822. If the added activities cannot be inserted into the schedule, back at step 820, then other modules may be notified.

Although not shown in FIG. 8, the optimization process may also be stopped if a Stop command is received. In this case, the most optimized schedule, its cost function, and other information related to the schedule are saved.

Table 8 lists various parameters that may be used by the optimizer. Fewer, additional, and/or different parameters may also be defined and used, and this is within the scope of the invention.

TABLE 8

| Optimizer Parameters | Values |
| --- | --- |
| Parts Replenishment Time Period | Time (in minutes) till when parts need to be considered Gives the immediate range (in minutes) over which optimization should be done in one run (e.g., to optimize a schedule for the entire day or the next 6 hrs) |
| Contract Scheduling Heuristic | The heuristic used to do carry out 'Contract Scheduling' 1-Unused 2-Insert without upsetting order of activities for employees 3-Insertion allowed to affect the order of activities |
| Save Interval | The interval (in minutes) for committing the state of the optimizer. The partially optimized schedule is committed to the database periodically (period = this value) |
| Activity Category | Only activities with the specified categories are loaded and operated on by the optimizer |
| Initial Heuristic | The heuristic used to do the initial plan |
| Parts Include Flag | Indicate if parts should be considered for optimization or not 0-Yes 1-No |
| Logging Level | Different degrees of event logging |
| Improvement Heuristic | Heuristic algorithm used for the optimization process 1-Greedy search 2-Steepest search 3-Greedy followed by a Taboo search 4-Steepest followed by Taboo 5-Greedy followed by Fast Guided Local Search 6-Steepest followed by Fast Guided Local Search 7-Greedy followed by Guided Taboo Search 8-Steepest followed by Guided Taboo Search |
| No-later-than Hard Rule | Constraint level of the no-later-than time 0-Soft rule 1-Hard rule |
| Freeze | The number of minutes from the time of load |
| Timeout | The maximum time (in minutes) for each run of the optimizer |
| Hours to End | Time (in hours) from the time of load to the end of the optimized time segment. Default is one minute before the start of the booking time segment. |
| Tardiness Cost | The cash value of violating the no-later-than constraint (unit: $/hr) |
| Mileage Cost | The cash value of violating the travel constraints |

The optimizer may be requested or may initiate a refresh of the data in the associated local storage. A refresh may be invoked to load data for one or more employees and/or one or more service regions. The refresh causes the current data to be deleted from the local storage and new data to be retrieved from the database, processed, and stored to the local storage for the optimizer.

Once optimization is performed on a schedule, the optimized schedule is maintained (i.e., glued) and no additional "normal" changes are made to the schedule. However, the glued schedule may be modified to account for emergencies and other high priority events, as described in further detail below.

Contract Scheduler

The scheduling system can be designed to book and schedule various types of activities. For normal activities, appointments are booked for the activities in available time slots in the booking time segment. A schedule with these activities may thereafter be optimized and then glued, and the activities in the glued schedule are eventually dispatched.

However, for certain types of activities (e.g., high priority activities), the optimized or glued schedule may need to be opened to insert these activities. Such high priority activities may include, for example, contract service activities having required completion time (i.e., the no-later-than time) close to the current time. In this case, the activities cannot be booked in the normal manner. Mechanisms are provided in the scheduling system to handle such activities, and to insert these activities into an optimized or (possibly) glued schedule in a manner to minimize disruption to an existing schedule and without significantly increasing the cost of the schedule.

A request may include the no-later-than time indicative of the latest time that the activity may be performed. This no-later-than time may be dictated, for example, by contractual obligations and/or other factors. The no-later-than time may be determined during the intake of a call from a customer and included in the request.

Based on the no-later-than time included in the received request, the scheduling system is able to determine whether the request (1) may be booked in the normal manner via the appointment booking system or (2) needs to be scheduled into an existing glued or optimized schedule, in which case the optimizer may be invoked. If the no-later-than time is firm (e.g., required to meet contractual obligations), then the emphasis is shifted to performing the activity within the specified time and not necessarily on optimality.

The optimizer may attempt to schedule a high-priority activity into an existing schedule using various schemes. In a first scheme, the activity is inserted between previously assigned activities for a particular employee. This employee may be selected based on the requirements for the activity (e.g., the required skill, tools, and parts) and other variables (e.g., the expected duration for the activity, the gaps between scheduled activities for employees, and so on). The optimizer may first determine the qualified employees for the activity and thereafter try to assign the activity to any qualified employee, one at a time. This scheme may minimize disruptions to the existing schedule.

In a second scheme, the optimizer may rearrange previously scheduled activities to insert the new activity. Other schemes may also be used, and this is within the scope of the invention.

The particular scheme to use to insert the new activity may be selected (e.g., via the Administration screen). Alternatively, the optimizer may initially use the first scheme to try to schedule the new activity, and may resort to the second scheme if the activity cannot be scheduled using the first scheme. For any scheme used, the optimizer may be executed to re-optimize the entire schedule.

Emergency Events

Last minute emergencies may arise and disrupt an optimized or glued schedule. These emergencies may arise when employees call in sick, vehicles break down, or upon occurrence of some other disruptive events. Mechanisms are provided in the scheduling system to handle such emergencies.

If an emergency event occurred that could disrupt a schedule, the time duration of the event is ascertained. The affected portion of the schedule (i.e., corresponding to the time duration of the emergency event and possibly some additional times before and after the event) may be reloaded. The schedule may then be rearranged in similar manner as for the original schedule, prior to the first optimization (e.g., all prior assignments may be changed). However, the additional constraints imposed by the emergency event are considered in the rearrangement of the activities. For example, previously scheduled activities for an employee who has become unavailable may be reassigned to other employees. The optimizer may then be invoked to re-optimize the rearranged schedule.

If the affected activities cannot be rescheduled, these activities can be identified and appropriate responsive actions may be performed. For example, employees designated to handle emergencies may be alerted to manually process the activities that cannot be rescheduled. Other modules may also be alerted to perform additional processing. The affected customers may also be informed, and new appointments may be made or the activities may be canceled.

Figure 9:
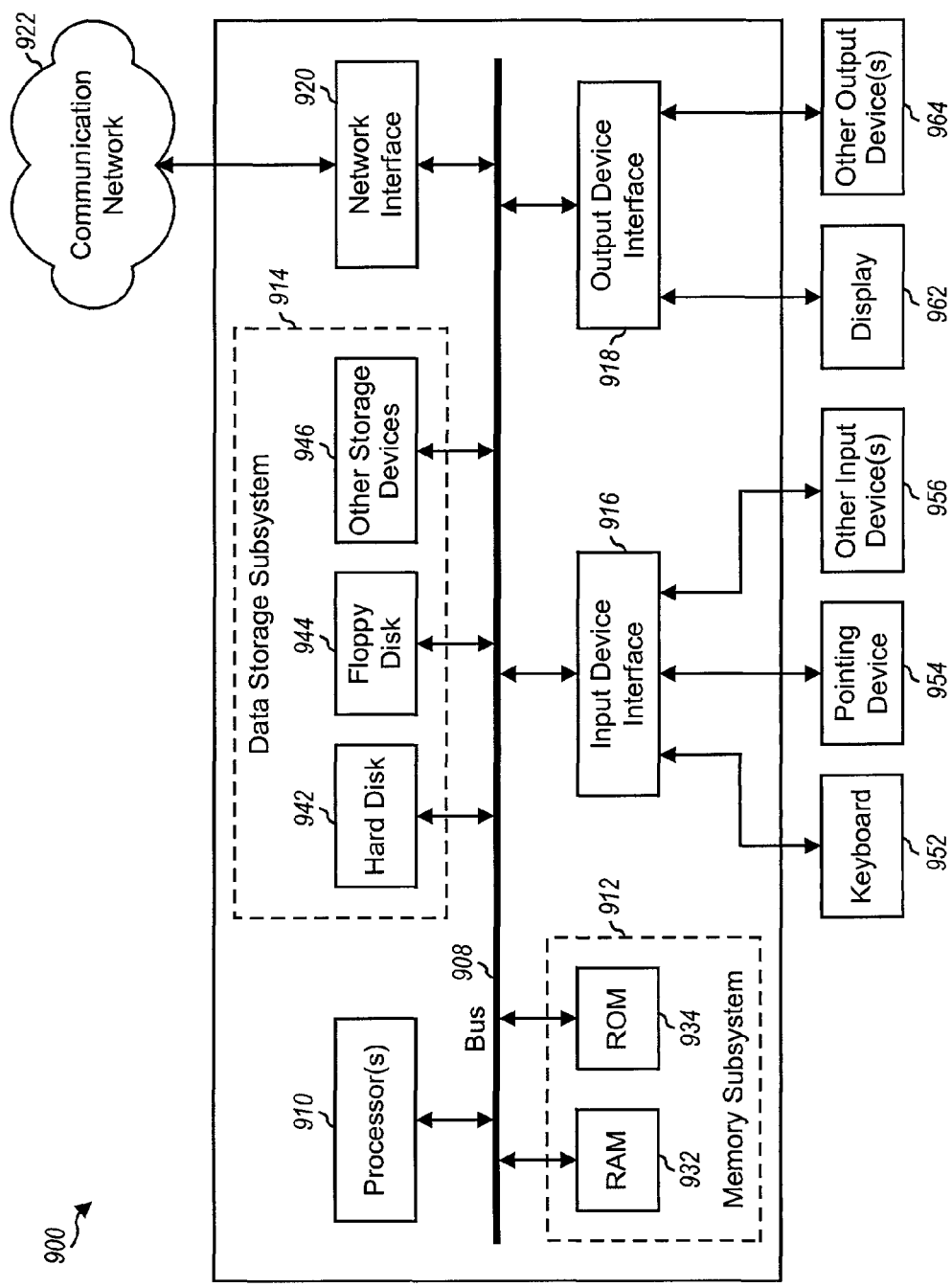
FIG. 9 is a block diagram of a computer system.

FIG. 9 is a block diagram of an embodiment of a computer system 900 that may be used to implement the servers and clients used for the scheduling system. As shown in FIG. 9, system 900 includes a bus 908 that interconnects major subsystems such as one or more processors 910, a memory subsystem 912, a data storage subsystem 914, an input device interface 916, an output device interface 918, and a network interface 920.

Bus 908 provides a means for allowing various components and subsystems of system 900 to communicate with each other. Many of the subsystems and components of system 900 need not be at the same physical location but may be distributed at various locations throughout a communication network. Although bus 908 is shown in FIG. 9 as a single bus, alternate designs for bus 908 may include multiple busses.

Processor(s) 910 perform many of the processing functions for system 900 and communicate with a number of peripheral devices via bus 908. Memory subsystem 912 and data storage subsystem 914 store the program codes and data that implement various aspects of the invention and further provide the functionality of system 900. These program codes and data are then provided to memory subsystem 912 and the codes are executed by processor(s) 910. In a distributed environment, the program codes and data may be stored on a number of computer systems and used by the processors of these systems.

Memory subsystem 912 typically includes a number of memories including a random access memory (RAM) 932 and a read only memory (ROM) 934. RAM 932 is typically used to store codes and data during program execution and ROM 934 is typically used to store fixed codes and data.

Data storage subsystem 914 provides persistent (non-volatile) storage for program codes and data, and may include a hard disk drive 942, a floppy disk drive 944, and other storage devices 946 such as a compact digital read only memory (CD-ROM) drive, an optical drive, and removable media cartridge disk drive. Each of the storage devices may be associated with removable media (e.g., floppy disks, CD-ROMs, cartridges). One or more of the storage devices may be located at remote locations and coupled to system 900 via communication network 922.

Input device interface 916 provides interface with various input devices such as a keyboard 952, a pointing device 954 (e.g., a mouse, a trackball, a touch pad, a graphics tablet, a scanner, or a touch screen), and other input device(s) 956. In general, the term "input device" is intended to include all possible types of devices and ways to input information into system 900. Via the input devices, the dispatcher is able to select and move activities using the drag-and-drop technique, refresh frames, update data, and perform many other functions.

Output device interface 918 provides an interface with various output devices such as a display 962 and other output device(s) 964. Display 962 may be a cathode ray tube (CRT), a flat-panel device such as a liquid crystal display (LCD), or some other visual devices. In general, the term "output device" is intended to include all possible types of devices and ways to output information from system 900 to a human or to another machine or computer systems. Via the output devices, the dispatcher is provided with the dispatch screen and other menus.

Network interface 920 provides an interface with outside networks including communication network 922. Through network interface 920, system 900 is able to communicate with other computer systems coupled to communication network 922. Network interface 920 may provide a wireline or wireless interface to communication network 922.

Many other devices or subsystems (not shown) may also be coupled to system 900. In addition, it is not necessary for all of the devices shown in FIG. 9 to be present to practice the invention. Furthermore, the devices and subsystems may be interconnected in configurations different from that shown in FIG. 9. The operation of a computer system such as that shown in FIG. 9 is readily known in the art and not described in detail herein. The source codes to implement some embodiments of the invention may be operatively disposed in memory subsystem 912 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A computer-implemented method for scheduling activities, comprising:
    receiving a request, from a user device, to book an appointment for an activity in a schedule,
    performing a check of a service region associated with the request;
    performing a check on a no-later-than time included in the request;
    performing a check on a no-sooner-than time included in the request;
    subsequent to the performing the check of the service region, the performing the check on the no-later-than time, and the performing the check on the no-sooner-than time, providing, to the user device, a plurality of time slots as possible appointment choices for the appointment, wherein
        time slots in the plurality of time slots provided as the possible appointment choices are available in the schedule for booking the activity;
    locking the plurality of time slots provided as the possible appointment choices to the user device, wherein
        the locking makes the plurality of time slots provided as the possible appointment choices unavailable for subsequent requests;
    receiving a rejection of the plurality of time slots provided as possible appointment choices, wherein
        the rejection is received from the user device;
    in response to the rejection,
        unlocking the plurality of time slots, and
        providing, to the user device, a substitute plurality of time slots as possible appointment choices for the appointment;
    receiving, from the user device, a selection for one of the time slots in the substitute plurality of time slots provided as the possible appointment choices;
    unlocking all time slots in the substitute plurality of time slots provided as the possible appointment choices other than the selected time slot, wherein
        the unlocking the all time slots in the substitute plurality of time slots other than the selected time slot is performed in response to the receiving the selection, and
        the unlocking the all time slots in the substitute plurality of time slots other than the selected time slot causes the unlocked time slots in the substitute plurality of time slots to become available for subsequent requests; and
    booking the activity in the selected time slot by updating information stored in a computer memory device.

2. The method of claim 1, further comprising:
    defining a duration for the time slots based on an expected duration for the activity;
    after the booking, optimizing the selected time slot, wherein
        the optimizing comprises rearranging a plurality of activities in the selected time slot,
        the rearranging is performed by a processor coupled to the computer memory device, and
        the optimizing is based at least in part on
            a cost function of the selected time slot; and
    optimizing a second time slot, wherein
        the optimizing the second time slot is performed substantially in parallel with the booking, and
        the second time slot and the selected time slot are distinct from each other.

3. The method of claim 1, further comprising:
    locking the schedule in response to the receiving the request, wherein the locking the schedule makes all time slots in the schedule unavailable for subsequent requests.

4. The method of claim 3, further comprising:
    unlocking the schedule after the providing the plurality of time slots.

5. The method of claim 1, further comprising:
    receiving a request for a next plurality of the time slots; and
    providing the next plurality of the time slots as additional possible appointment choices, wherein
        the time slots in the next plurality of the time slots are not included among time slots previously provided for the activity.

6. The method of claim 1, further comprising:
    receiving a request for a particular number of additional time slots; and
    providing the requested number of additional time slots, if available, as the possible appointment choices.

7. The method of claim 1, wherein the locked time slots are released after a particular amount of time.

8. The method of claim 1, further comprising:
    determining available time slots in the schedule for booking the activity based on a set of parameters associated with the activity and parameters associated with resources in the schedule.

9. The method of claim 8, wherein the available time slots are determined based in part on an earliest time and a latest time between which the activity may be booked.

10. The method of claim 1, further comprising:
    optimizing the schedule for a particular time segment to provide a more optimum schedule having a lower cost.

11. The method of claim 1, wherein the schedule is partitioned into a plurality of time segments.

12. The method of claim 11, wherein new appointments are booked in a first time segment of the schedule.

13. The method of claim 11, further comprising:
optimizing a first time segment of the schedule to provide a schedule having a lower cost.

14. The method of claim 11, wherein a first time segment of the schedule is fixed, and no changes due to non-emergency events are made to the first time segment of the schedule.

15. The method of claim 1, wherein:
the plurality of time slots provided as possible appointment choices is based at least in part on corresponding costs associated with the possible appointment choices, and
the locking the plurality of time slots comprises temporarily locking the plurality of time slots for a predetermined timeout period.

16. A scheduling system comprising:
a first local storage device; and
an appointment booking system, coupled to the first local storage device and configured to
receive a request to book an appointment for an activity in a schedule,
perform a check of a service region associated with the request,
perform a check on a no-later-than time included in the request,
perform a check on a no-sooner-than time included in the request,
provide a plurality of time slots as possible appointment choices for the appointment, subsequent to the perform the check of the service region, the perform the check on the no-later-than time, and the perform the check on the no-sooner-than time, wherein
time slots in the plurality of time slots provided as the possible appointment choices are available in the schedule for booking the activity,
lock the plurality of time slots provided as the possible appointment choices so that the plurality of time slots provided as the possible appointment choices are unavailable for subsequent requests,
receive a rejection of the plurality of time slots provided as possible appointment choices,
in response to the rejection,
unlock the plurality of time slots, and
provide a substitute plurality of time slots as possible appointment choices for the appointment,
receive a selection for one of the time slots in the substitute plurality of time slots provided as the possible appointment choices,
unlock, in response to the selection, all time slots in the substitute plurality of time slots provided as the possible appointment choices other than the selected time slot so that the unlocked time slots in the substitute plurality of time slots are available for subsequent requests, and
update a record in the first local storage device to book the activity in the selected time slot.

17. The scheduling system of claim 16, further comprising:
an optimizer configured to
receive a set of constraints comprising:
constraints related to one or more activities in the schedule, and
constraints related to one or more candidate resources for the one or more activities,
compute a current cost for the schedule based on a cost function,
rearrange activities in the selected time slot based on the set of constraints,
compute a new cost for the schedule using the cost function and the rearranged activities in the selected time slot,
compare the new cost and the current cost, and
revise the schedule based at least in part on
an improvement algorithm, and
a comparison of the new cost and the current cost.

18. The scheduling system of claim 17, wherein the optimizer is configured to operate substantially in parallel with the appointment booking system.

19. The scheduling system of claim 17, wherein the constraints related to the one or more activities comprise one or more of:
a location constraint, or
a required equipment constraint.

20. The scheduling system of claim 17, wherein the constraints related to the one or more activities comprise one or more of:
a time constraint,
a constraint relating to type-of-activity, or
a constraint relating to priority-of-activity.

21. The scheduling system of claim 17, wherein the constraints related to the one or more candidate resources comprise one or more of:
a constraint relating to equipment available to a human resource, and
a constraint relating to locations in which the human resource is available.

22. The scheduling system of claim 17, wherein the constraints related to the one or more candidate resources comprise one or more of:
a constraint relating to a skill of an available human resource, and
a constraint relating to times during which the human resource is available.

23. A computer program product, comprising:
a non-transitory computer-readable storage medium; and
instructions encoded on the computer-readable storage medium, wherein the instructions are executable by one or more processors to perform a method for scheduling activities, the method comprising:
receiving a request to book an appointment for an activity in a particular schedule,
performing a check of a service region associated with the request,
performing a check on a no-later-than time included in the request,
performing a check on a no-sooner-than time included in the request,
subsequent to the performing the check of the service region, the performing the check on the no-later-than time, and the performing the check on the no-sooner-than time, providing a plurality of time slots as possible appointment choices for the appointment, wherein
time slots in the plurality of time slots provided as the possible appointment choices are available in the schedule for booking the activity,
locking the plurality of time slots provided as the possible appointment choices, wherein the locking makes the plurality of time slots provided as the possible appointment choices unavailable for subsequent requests,
receiving a rejection of the plurality of time slots provided as possible appointment choices
in response to the rejection,
unlocking the plurality of time slots, and
providing a substitute plurality of time slots as possible appointment choices for the appointment, receiving a selection for one of the time slots in the substitute plurality of time slots provided as the possible appointment choices,
unlocking all time slots in the substitute plurality of time slots provided as the possible appointment choices other than the selected time slot, wherein
   the unlocking the all time slots in the substitute plurality of time slots other than the selected time slots is performed in response to the receiving the selection, and
   the unlocking the all time slots in the substitute plurality of time slots other than the selected time slots causes the unlocked time slots in the substitute plurality of time slots to become available for subsequent requests, and
booking the activity in the selected time slot.

* * * * *

UNITED STATES PATENT AND TRADEMARK OFFICE
CERTIFICATE OF CORRECTION

PATENT NO. : 8,781,873 B2
APPLICATION NO. : 10/112913
DATED : July 15, 2014
INVENTOR(S) : Purohit et al.

It is certified that error appears in the above-identified patent and that said Letters Patent is hereby corrected as shown below:

In the Claims

Column 27, lines 29-30, in Claim 16, delete "the perform" and insert -- perform --, therefor.

Column 27, line 30, in Claim 16, delete "the perform" and insert -- perform --, therefor.

Column 27, line 31, in Claim 16, delete "the perform" and insert -- perform --, therefor.

Signed and Sealed this
Twenty-fourth Day of February, 2015

Michelle K. Lee
*Deputy Director of the United States Patent and Trademark Office*